US005900886A

United States Patent [19]
Shay

[11] Patent Number: 5,900,886

[45] Date of Patent: May 4, 1999

[54] DISPLAY CONTROLLER CAPABLE OF ACCESSING AN EXTERNAL MEMORY FOR GRAY SCALE MODULATION DATA

[75] Inventor: Michael John Shay, Arlington, Tex.

[73] Assignee: National Semiconductor Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/451,319

[22] Filed: May 26, 1995

[51] Int. Cl.[6] .................................................... G06F 13/00

[52] U.S. Cl. ......................... 345/511; 345/508; 345/513; 345/516; 345/89; 345/148

[58] Field of Search .................................... 345/147, 148, 345/89, 98, 99, 185, 189, 190, 200, 203, 511, 508, 509, 513, 516; 395/164, 166; 84/627

[56] References Cited

U.S. PATENT DOCUMENTS

| | | | |
|---|---|---|---|
| 3,873,815 | 3/1975 | Summers | 235/150.3 |
| 4,287,805 | 9/1981 | Gross | 84/627 |
| 4,642,789 | 2/1987 | Lavelle . | |
| 4,642,794 | 2/1987 | Lavelle et al. . | |
| 4,799,053 | 1/1989 | Aken et al. . | |
| 4,942,553 | 7/1990 | Dalrymple et al. . | |
| 5,027,330 | 6/1991 | Miller . | |
| 5,084,841 | 1/1992 | Williams et al. . | |
| 5,172,108 | 12/1992 | Wakabayashi et al. | 345/148 |
| 5,185,602 | 2/1993 | Bassetti, Jr. et al. | 345/148 |
| 5,187,578 | 2/1993 | Kohgami et al. | 345/148 |
| 5,189,319 | 2/1993 | Fung et al. . | |
| 5,196,839 | 3/1993 | Johary et al. | 345/148 |
| 5,204,953 | 4/1993 | Dixit | 395/400 |
| 5,206,635 | 4/1993 | Inuzuka et al. | 345/99 |
| 5,254,888 | 10/1993 | Lee et al. . | |
| 5,254,981 | 10/1993 | Disanto et al. | 345/149 |
| 5,259,006 | 11/1993 | Price et al. | 375/107 |
| 5,278,956 | 1/1994 | Thomsen et al. | 395/250 |
| 5,293,468 | 3/1994 | Nye et al. | 395/131 |

(List continued on next page.)

FOREIGN PATENT DOCUMENTS

| | | |
|---|---|---|
| 0393487 | 10/1990 | European Pat. Off. . |
| 0 507 571 A3 | 10/1992 | European Pat. Off. . |
| 0 552 506 A1 | 7/1993 | European Pat. Off. . |
| 7020833 | 1/1995 | Japan . |
| 7178972 | 7/1995 | Japan . |
| WO 84/00236 | 1/1984 | WIPO . |
| 90/12388 | 10/1990 | WIPO . |
| WO 92/20061 | 11/1992 | WIPO . |

OTHER PUBLICATIONS

Serra, Micaela & Dervisoglu, Bulent I, "Testing", Chapter 79, *The Electrical Engineering Handbook,* Richard C. Dorf, Editor–in–Chief, pp. 1808–1837, CRC Press.

L–T Wang et al., "Feedback Shift–Registers For Self–Testing Circuits", *VLSI Systems Design,* Dec. 1986.

Masakazu Shoji, "CMOS Dynamic Gates", Chapter 5, *AT&T CMOS Digital Circuit Technology,* Prentice Hall, 1988, pp. 210–257.

(List continued on next page.)

*Primary Examiner*—Richard Hjerpe
*Assistant Examiner*—Kent Chang
*Attorney, Agent, or Firm*—Limbach & Limbach L.L.P.

[57] ABSTRACT

A display controller includes a data bus interface which transfers data to the display controller from external sources. A modulation data register coupled to the data bus interface receives a first quantity of modulation data through the data bus interface. A decoder coupled to the modulation data register receives the first quantity of modulation data and decodes graphics data according to the first quantity of modulation data in order to generate display data. A modulation data address counter counts quantities of modulation data that are transferred through the data bus interface and generates a load modulation data signal when a preprogrammed total quantity of modulation data has been transferred through the data bus interface. A method used by a display controller of accessing modulation data from an external memory is also disclosed.

9 Claims, 19 Drawing Sheets

U.S. PATENT DOCUMENTS

| | | | |
|---|---|---|---|
| 5,307,056 | 4/1994 | Urbanus | 345/189 |
| 5,335,322 | 8/1994 | Mattison | 395/164 |
| 5,379,399 | 1/1995 | Conway-Jones et al. . | |
| 5,389,948 | 2/1995 | Liu | 345/148 |
| 5,404,473 | 4/1995 | Papworth et al. | 395/375 |
| 5,408,626 | 4/1995 | Dixit | 395/400 |
| 5,430,838 | 7/1995 | Kuno et al. | 345/189 |
| 5,506,809 | 4/1996 | Csoppenszky et al. . | |
| 5,530,458 | 6/1996 | Wakasu . | |
| 5,534,889 | 7/1996 | Reents et al. | 345/148 |
| 5,537,128 | 7/1996 | Keene et al. | 345/89 |
| 5,557,733 | 9/1996 | Hicok et al. | 395/162 |
| 5,581,280 | 12/1996 | Reinert et al. . | |
| 5,617,118 | 4/1997 | Thompson | 345/200 |

OTHER PUBLICATIONS

Guthrie, Charles, "Power–On Sequencing For Liquid Crystal Displays; Why, When, And How", *Sharp Application Notes,* Sharp Corporation, 1994, pp. 2–1 thru 2–9.

Bernd Moeschen, "NS32SP160—Feature Communication Controller Architecture Specification", *National Semiconductor,* Rev. 1.0, May 13, 1993.

Agarwal, Rakesh K., *80×86 Architecture and Programming, Volume II: Architecture Reference,* Chapter 4, Prentice Hall, 1991, pp. 542–543.

Intel486 Microprocessor Family Programmer's Reference Manual, Intel Corporation, 1993.

"8237A High Performance Programmable DMA Controller (8237A, 8237A–4, 8237A–5)", *Peripheral Components,* Intel, 1992, pp. 3–14 thru 3–50.

Kane, Gerry, "R2000 Processor Programming Model", Chapter 2, *MIPS RISC Architecture,* MIPS Computer Systems, Inc.

Hennessy, John, et al., "Interpreting Memory Addresses", *Computer Architecture A Quantitative Approach,* pp. 95–97, Morgan Kaufmann Publishers, Inc. 1990.

*PowerPC601 Reference Manual,* IBM, 1994, Chapter 9, "System Interface Operation", pp. 9–15 thru 9–17.

Intel Corp. Microsoft Corp., *Advanced Power Management (APM) BIOS Interface Specification,* Revision 1.1, Sep. 1993.

Intel Corporation, *i486 Micro Processor Hardware Reference Manual,* Processor Bus, pp. 3–28 thru 3–32.

GLUT WORD

| Even Byte | | Odd Byte | |
|---|---|---|---|
| Even Row | Even Row | Odd Row | Odd Row |
| dark gray decode nibble | light gray decode nibble | dark gray decode nibble | light gray decode nibble |
| Bits: D7, D6, D5, D4 | Bits: D3, D6, D1, D0 | Bits: D15, D14, D13, D12 | Bits: D11, D10, D9, D8 |

NOTE: Graphic bit pairs ON (0,0) and OFF (1,1) are mapped to decoded values of (0) and (1), respectively

FIG. 7

LIGHT AND DARK GRAY
GLUT WORD DECODING MAP

| Odd/Even graphic bit pair values / byte position of bit pairs | even row dark pixel (1,0) encoding | even row light pixel (0,1) encoding | odd row dark pixel (1,0) encoding | odd row light pixel (0,1) encoding |
|---|---|---|---|---|
| [7:6] | D7 | D3 | D15 | D11 |
| [5:4] | D6 | D2 | D14 | D10 |
| [3:2] | D5 | D1 | D13 | D9 |
| [1:0] | D4 | D0 | D12 | D8 |

FIG. 8

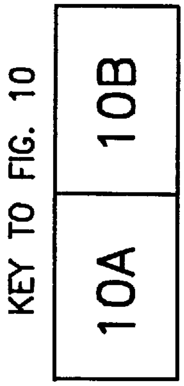
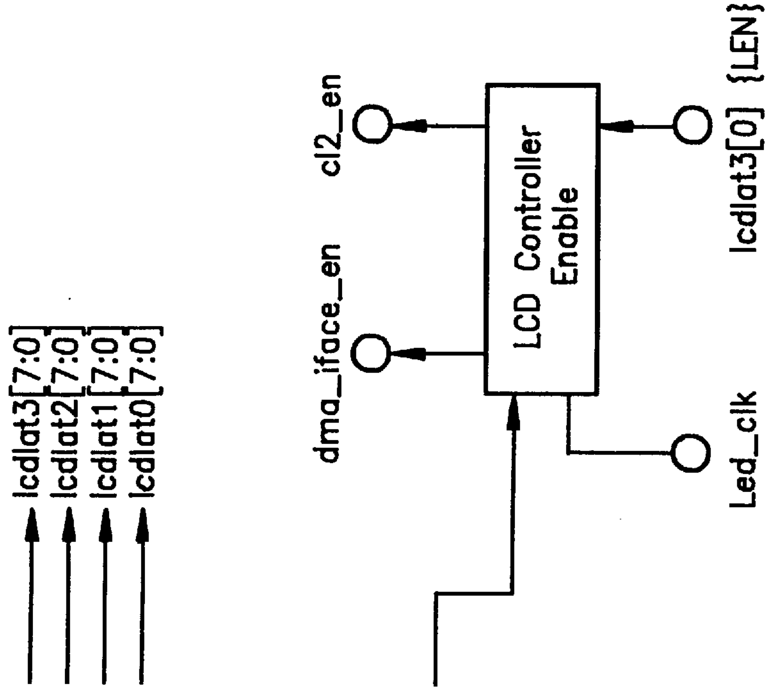
FIG. 10B

FIG. 11A

| BASEDV[1] | BASEDV[0] | Binary Division |
|---|---|---|
| 0 | 0 | /1 |
| 0 | 1 | /2 |
| 1 | 0 | /4 |
| 1 | 1 | /8 |

FIG. 11B

| CKDVBS [2] | CKDVBS [1] | CKDVBS [0] | Integer Division |
|---|---|---|---|
| 0 | 0 | 0 | /2 |
| 0 | 0 | 1 | /3 |
| 0 | 1 | 0 | /5 |
| 0 | 1 | 1 | /7 |
| 1 | 0 | 0 | /9 |
| 1 | 0 | 1 | /11 |
| 1 | 1 | 0 | /13 |
| 1 | 1 | 1 | reserved |

FIG. 11C

| SIZE[1] | SIZE[0] | Screen Size |
|---|---|---|
| 0 | 0 | 320 x 240 |
| 0 | 1 | 320 x 200 |
| 1 | 0 | 480 x 320 |
| 1 | 1 | reserved |

FIG. 12

| FIFTHRS[1] | FIFTHRS[0] | FIFO fill threshold |
|---|---|---|
| 0 | 0 | Eighth |
| 0 | 1 | Quarter |
| 1 | 0 | Half |
| 1 | 1 | Three_quarters |

LCD STANDARD DMA WRITE CYCLE

NOTE: $\overline{EOP\_Z}$ remains high during standard DMA write cycles to the LCD Controller

DISPLAY CONTROLLER CAPABLE OF ACCESSING AN EXTERNAL MEMORY FOR GRAY SCALE MODULATION DATA

BACKGROUND OF THE INVENTION

1. Field of the Invention

The present invention relates to display controllers, and more particularly, to a display controller capable of accessing an external memory for gray scale modulation data.

2. Description of the Related Art

One commonly used type of display panel is a liquid crystal display (LCD) panel. An LCD display panel is a rectangular grid of rectangular or square dots. Acting as a thin double-paned window, the LCD grid is actually transparent electrodes laid out in horizontal rows on one thin pane, and in vertical columns on the other. The liquid crystal formula trapped in between the panes reacts to an electrical field applied to each electrode in the rows and columns. This reaction rotates the polarization of light transmitted through the LCD display. Polarizing layers outside the panes cause the dots to appear light or dark as the polarization changes. There are small gaps between the rows and columns, giving each dot a clear definition.

The display is controlled by continuously feeding dot data to the display. The data is organized into individual pixels, rows of pixels, and full-page frames. Pixels are the individual data dots or bits. These bits are put together into rows. A set of rows makes up a frame. A frame is one full page of the display. LCD data is continuously sent to the LCD panel to refresh the display frame.

Since most LCD displays have no on-board frame buffer memory, the display data must be continuously refreshed. To get a stable, flicker-free image, the display data is sent to the panel at a frame refresh rate (referred to herein as the "frame rate") which falls within a range normally specified by the LCD panel manufacturer. An LCD panel manufacturer may specify, for example, that best results are obtained, i.e., a stable, flicker-free image, when the display data is sent to the panel 60 to 70 times per second, or 60 Hz to 70 Hz.

An LCD controller is typically used to coordinate the transfer of display data to an LCD panel. Two important functions performed by an LCD controller are: 1) gray scale modulation, and 2) sending display data to the display panel within the specified frame rate range.

In order to create an image on an LCD screen, each pixel is constantly being refreshed at the frame rate. If only two different colors are needed, i.e., on (white or bright) and off (black or dark), a zero is always sent for white and a one is always sent for black. For example, assuming that each pixel is refreshed 60 times per second, i.e., a frame rate of 60 Hz, if a pixel is white, the value of zero will be sent 60 times for each second (for that bit), and if the pixel is black (or dark), a one will be sent for 60 times. In this scenario the graphics data (the one and zeros indicating white and black) can basically be fed directly to the display.

However, when more than two colors are needed on the LCD screen, gray scale modulation is performed to create an LCD image that appears to be stable and appears to be some shade between on (white or bright) and off (black or dark). Gray scale modulation is a process of sending a value of one to the screen for a percentage of the time to create a pixel that is light or dark gray. The rate at which the pixels are turned on and off determines how light or dark they appear. For example, if a one is sent for 45 times, and a zero is sent for 15 times (during the 60 Hz refresh), a dark gray will appear on the screen. If a one is sent for 15 times, and a zero is sent for 45 times, a light gray will appear.

In general, an LCD controller receives graphics data and then generates and provides the appropriate ones and zeros to the display panel which are needed to display the specified shade of gray for each pixel in the frame. Because of the nature of LCD displays, gray scale modulation is done in a temporal (or time) and spatial modulated way. The term "temporal" refers to the frequency at which individual pixels are turned on and off. The term "spatial" refers to the relationship of one pixel to an adjacent or nearby pixel. Specifically, in order to prevent flickering, adjacent pixels of the same gray value will be modulated at different frequencies. Thus, the brightness of each pixel in the display is determined by the temporal modulation of the applied voltage pulses to the respective pixels.

Previous LCD controllers performed such temporal modulation by manipulating the graphics data with a fixed algorithm. One available LCD controller uses another set of data, referred to herein generally as gray scale modulation data, in conjunction with the graphics data to perform temporal modulation. That LCD controller includes two on-board registers for holding the gray scale modulation data. The gray scale modulation data is initially supplied to the LCD controller by a CPU. When more gray scale modulation data is needed, the LCD controller interrupts the CPU so it can update the on-board registers. Numerous interrupts, however, reduces the efficiency of the CPU. The number of interrupts can be reduced by increasing the number of registers in the LCD controller that are used to hold gray scale modulation data. However, this has the undesired effect of increasing the LCD controller die size.

Thus, there is a need for an LCD controller which has access to an increased quantity of gray scale modulation data in order to decrease CPU interrupts, but which does not have an increased die size.

SUMMARY OF THE INVENTION

The present invention provides a display controller. A data bus interface transfers data to the display controller from external sources. A modulation data register coupled to the data bus interface receives a first quantity of modulation data through the data bus interface. A decoder coupled to the modulation data register receives the first quantity of modulation data and decodes graphics data according to the first quantity of modulation data in order to generate display data. A modulation data address counter counts quantities of modulation data that are transferred through the data bus interface and generates a load modulation data signal when a preprogrammed total quantity of modulation data has been transferred through the data bus interface.

The present invention also provides a method used by a display controller of accessing modulation data from an external memory, which includes the steps of: generating a data request signal which initiates transfer of a first quantity of modulation data to the display controller from an external memory; receiving the first quantity of modulation data in a modulation data register; transferring the first quantity of modulation data to a decoder; decoding graphics data according to the first quantity of modulation data in order to generate display data; counting quantities of modulation data that are transferred to the display controller; generating a load modulation data signal in response to a preprogrammed total quantity of modulation data being transferred to the display controller; and generating a CPU interrupt in response to the load modulation data signal.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

FIG. 7 is a block diagram illustrating one word of gray scale look-up table (GLUT) data which may be stored in the external memory shown in FIG. 5.

FIG. 8 is a table illustrating a GLUT word decoding map for the GLUT word shown in FIG. 7.

FIGS. 11A–11C are tables illustrating the operation of configuration register two shown in FIG. 10.

FIG. 12 is a table illustrating the operation of configuration register three shown in FIG. 10.

DETAILED DESCRIPTION OF THE PREFERRED EMBODIMENT

Figure 1:
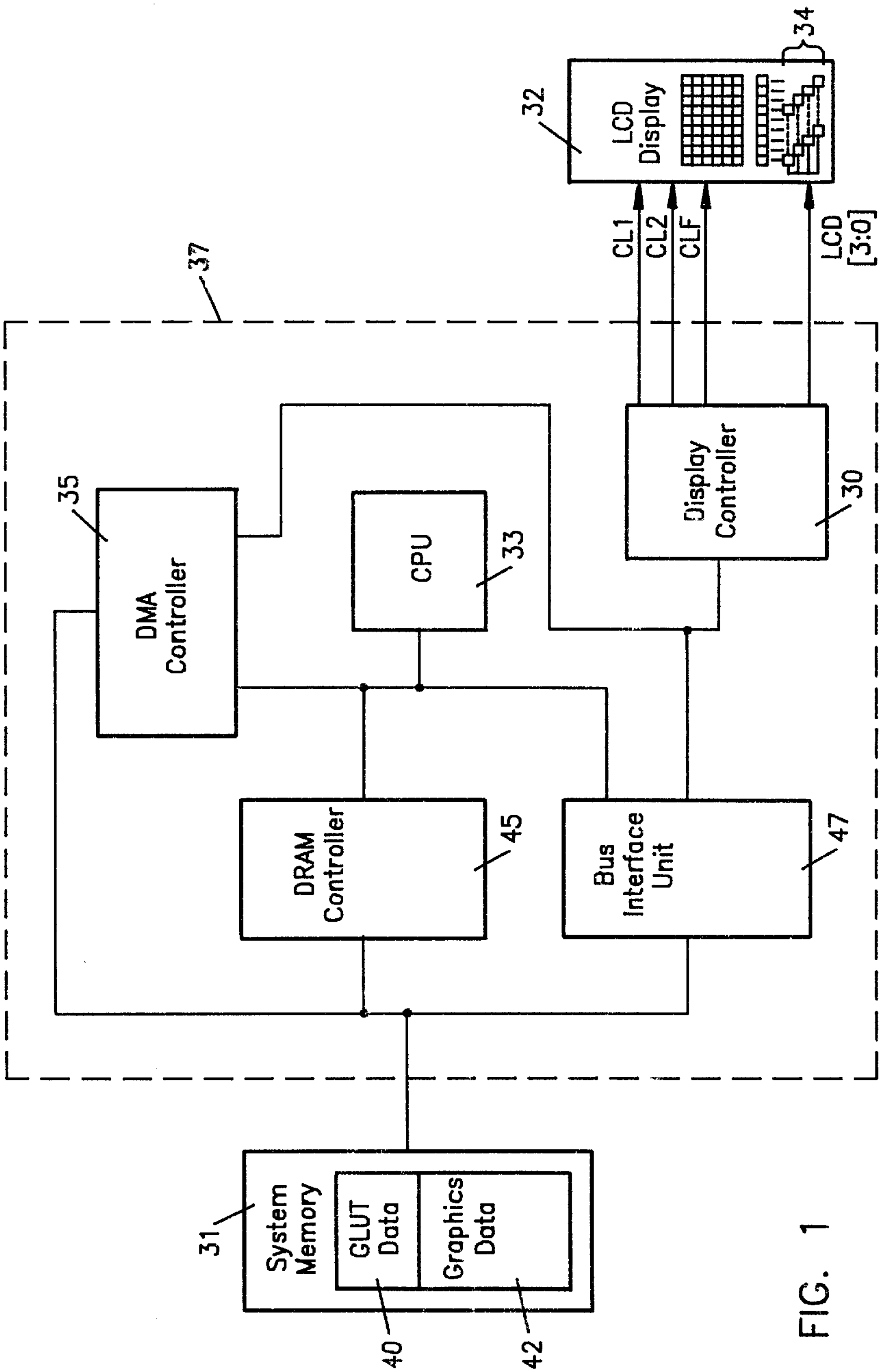
FIG. 1 is a block diagram illustrating a display controller in accordance with the present invention connected to an LCD display.

Referring to FIG. I there is illustrated a display controller 30 in accordance with the present invention. The display controller 30 overcomes the disadvantages of conventional controllers by having the capability of accessing gray scale modulation data 40 which is stored external to the display controller 30. The gray scale modulation data 40 is referred to herein as gray scale look-up table (or "GLUT") data 40. The term "external" as used herein is intended to mean external to the display controller 30. Because the GLUT data 40 is stored externally, the die size of the display controller 30 is not increased. Furthermore, as will be discussed in detail below, the size of the GLUT data 40 storage area can be increased and even made programmable.

The display controller 30 described herein, which is shown controlling the LCD display 32, is capable of controlling a variety of supertwist LCD panels. For example, a few of the supported configurations include 320×240, 320×200 and 480×320 with monochrome or gray scale graphics LCD modules equipped with self-contained screen drivers. Furthermore, the gray scale modulation scheme discussed below may also be used for a large number of ¼ and ½ size VGA, XVGA, and SVGA screen sizes with excellent image quality. The display controller 30 supports inverse video displays with programmable blinking rates. Two types of screen display modes are selectable. The first type is inverse video display (See bit [1] of configuration register one, discussed below), and the second type is display in blink mode where the duration and background are selectable (See bits [7:5] of configuration register four). It should be understood, however, that the use of the display controller 30 is not limited to LCD displays or to any specific size or type of screen. It is envisioned that the teachings of the present invention may be applied to display controllers used to control other types of displays, such as TFT displays.

The programming of the display controller 30 is controlled by an external CPU 33. Graphics data for the display controller 30 is preferably stored in an external memory 42. The external memory 42 may be either a dedicated video RAM, or part of a shared system memory 31 (e.g., a DRAM or SRAM) used by both the external CPU 33 and the display controller 30. The memory interface is preferably built through a channel in an external DMA (direct memory access) controller 35 which transfers the graphics data from the external memory 42 to the display controller 30. This minimizes CPU 33 overhead and permits the LCD display 32 to continue even with the CPU 33 in idle or power save modes. The display controller 30 may be a stand-alone device, e.g., built as its own integrated circuit (IC), or it may be incorporated or integrated into a larger IC as indicated by 37. Such an IC 37 may include other on-board components, such as for example, the CPU 33, the DMA controller 35, a DRAM controller 45, and/or a bus interface unit (BIU) 47.

In order to understand how the display controller 30 uses the GLUT data 40, the general operation of the display controller 30 should first be understood. The display controller 30 converts the graphics data 42 into display data, and then sends the display data to the LCD display 32 via the LCD[3:0] signal lines. The sequencing of the display data is controlled with three clock signals: a row pulse clock CL1, a dot clock CL2, and a frame signal CLF. The frame signal CLF indicates the start of a frame of data. The dot clock CL2 is used to clock the display data LCD[3:0] four pixels at a time into shift registers 34 in the LCD display 32.

Figure 2:
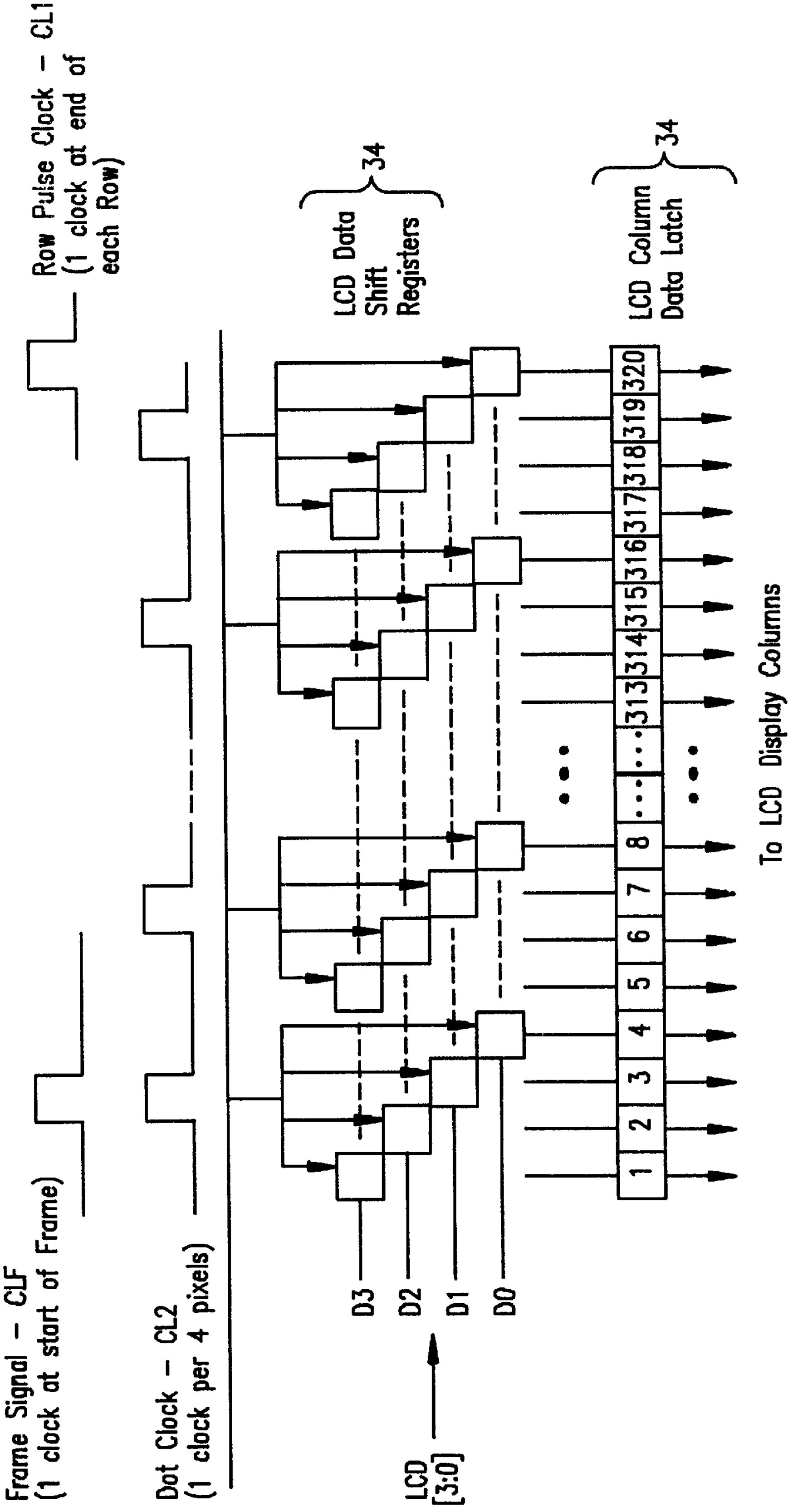
FIG. 2 is a block diagram illustrating shift registers included in the LCD display shown in FIG. 1.
Figure 3:
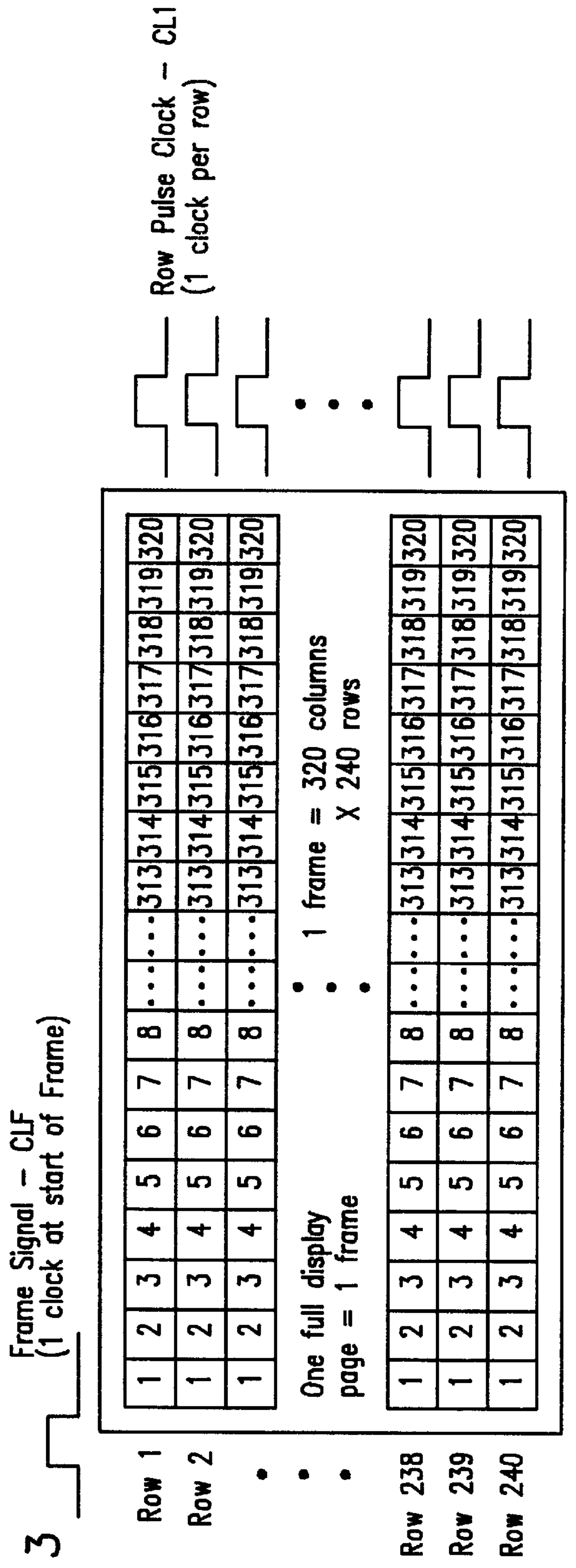
FIG. 3 is a block diagram illustrating a pixel and row arrangement on the screen of the LCD display shown in FIG. 1.

Referring to FIG. 2, as the display data LCD[3:0] is sent to the LCD display 32 in four pixel nibbles, it is sequentially organized into a full row of data in the shift registers 34. Specifically, the shift registers 34 store the nibbles until they have an entire row (320 in the example shown in FIG. 2). The row pulse clock CL1 indicates when a full row of pixels has been sent. Upon the arrival of the row pulse clock CL1, the LCD display 32 outputs the contents of the shift registers 34 to the internal column drivers 36. A row counter is incremented and the next row of display data LCD[3:0] is stored in the shift registers 34. Similarly, the row pulse clock CL1 indicates when that row is full and the contents of the shift registers 34 are again output to the internal column drivers 36. In this way, the entire frame is sequentially written. A frame consists of a given number of rows of a given number of pixels. For example, as shown in FIG. 3, a 320×240 display would have a row consisting of 320 pixels.

A set of 240 rows would consist of a complete display frame of 320×240. A complete frame of data makes up one full display screen.

Figure 4:
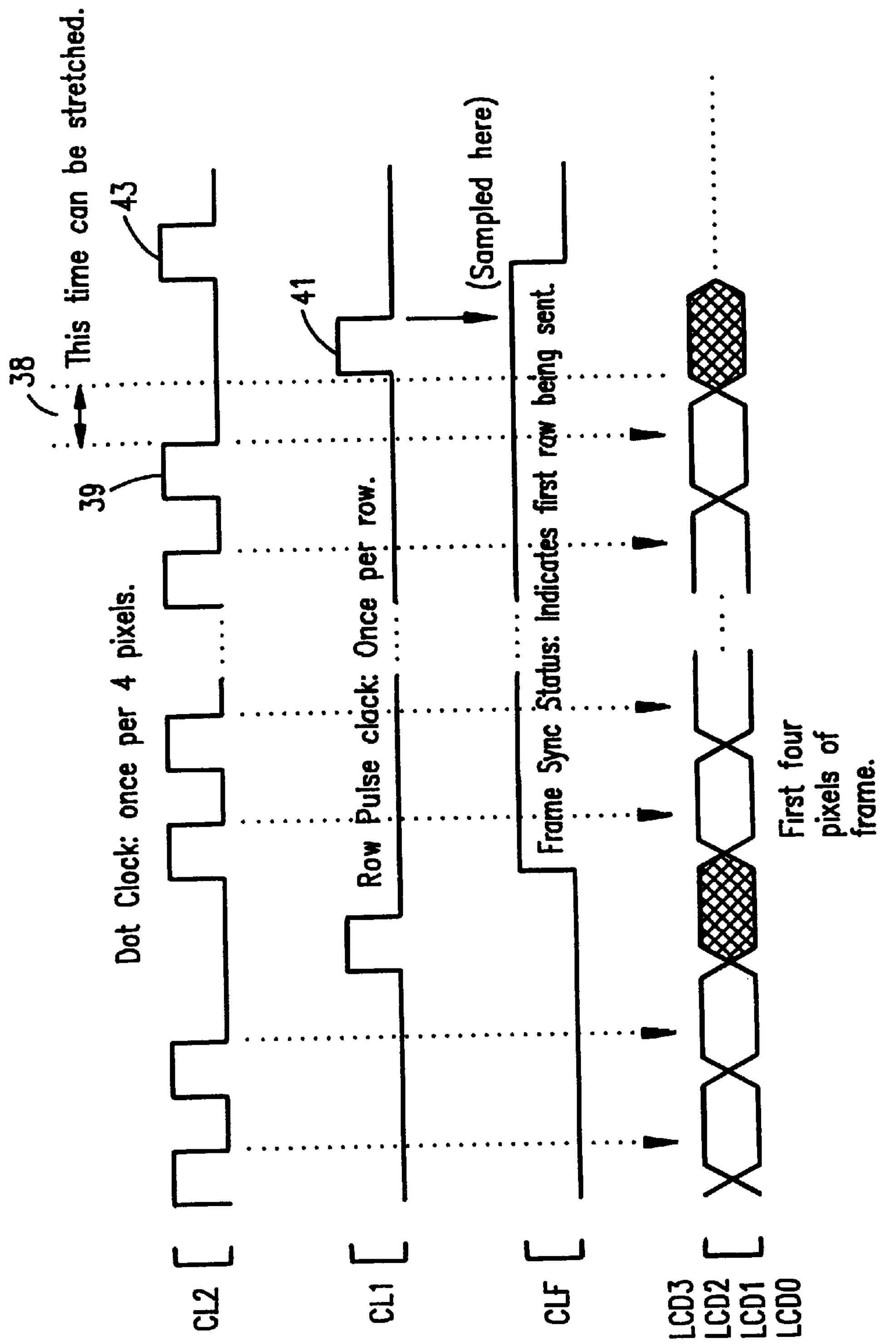
FIG. 4 is a timing diagram illustrating the clocking signals generated by the display controller shown in FIG. 1.

Referring to FIG. 4, the display data LCD[3:0] is clocked out of the display controller 30 and into the shift registers 34 on the falling edge of the dot clock CL2. Each dot clock CL2 pulse clocks four pixels into the internal shift registers 34. The pixels are taken from lines LCD[3:0], with the left most pixel on LCD[3]. As will be discussed below, the dot clock CL2 is derived from two levels of input clock processing, and specifically, two levels of clock division. Bits [7:3] of configuration register two define the level of clock division.

Once all the pixels of a row have been sent, the display controller 30 applies a pulse on the row pulse clock CL1. This writes the row onto the display and advances to the next row. The row pulse clock CL1 is generated by counting the number of dot clock CL2 cycles. For example, because there is one dot clock CL2 pulse for every 4 pixels, there would be 80 dot clock CL2 cycles for 320 pixels. As data is presented for the first row of the frame, the frame signal CLF is brought high, and is held through the first row pulse clock CL1, as shown.

Because of the varying characteristics of each LCD display, the exact frame refresh rate generated by the display controller 30 has a significant bearing on the final image quality of the display. The accuracy of the frame rate at which the LCD controller sends display data to the display panel is important for at least two reasons. First, as mentioned above, a stable, flicker-free image will result if the display data is sent to the panel at a frame rate which falls within the specified range. Second, the generation of gray scales is largely affected by the frame rate via temporal modulation. The display controller 30 allows the programmer to experiment with the precise frame refresh rate required to optimize image quality. Specifically, this is accomplished by allowing the programmer to add an amount of “offset” time 38 to the time between the last dot clock CL2 pulse 39 of a row and the row pulse clock CL1 41. Additional offset dot clock CL2 times are added to create a precise frame refresh rate. The offset dot clock CL2 times are not additional pulses, but are just the amount of time of a dot clock CL2 pulse. In other words, the programmer may vary the time between the last dot clock CL2 and the row pulse clock CL1 by a few CL2 pulse times in order to optimize the visual image for the given display characteristics. In this way, the dot clock CL2 start pulse 43 of the next row is shifted or stretched away from the dot clock CL2 pulse 39 of the previous row. This fine-tunes the frame refresh rate and results in excellent image quality regardless of the LCD display characteristics.

Thus, the row pulse clock CL1 is generated by counting the number of dot clock CL2 cycles and any programmed untransmitted dot clock CL2 offset cycles. In the embodiment of the display controller 30 described herein, as little as 1 offset dot clock CL2 time to as many as 16 additional offset dot clock CL2 times can be added to the time between the last dot clock CL2 pulse 39 and the row pulse clock CL1 41. The programmed untransmitted dot clock CL2 offset times are programmed by setting bits [3:0] of configuration register three (discussed below). Furthermore, this time can be varied “on-the-fly” so that the programmer can see the real-time effect of different values in these bits. It should be well understood, however, that the programmable offset time range of 1 to 16 dot clock CL2 times maybe expanded or reduced. Furthermore, the increments of the programmed offset time, e.g., 1 pulse increments, may also be expanded or reduced.

Figure 5:
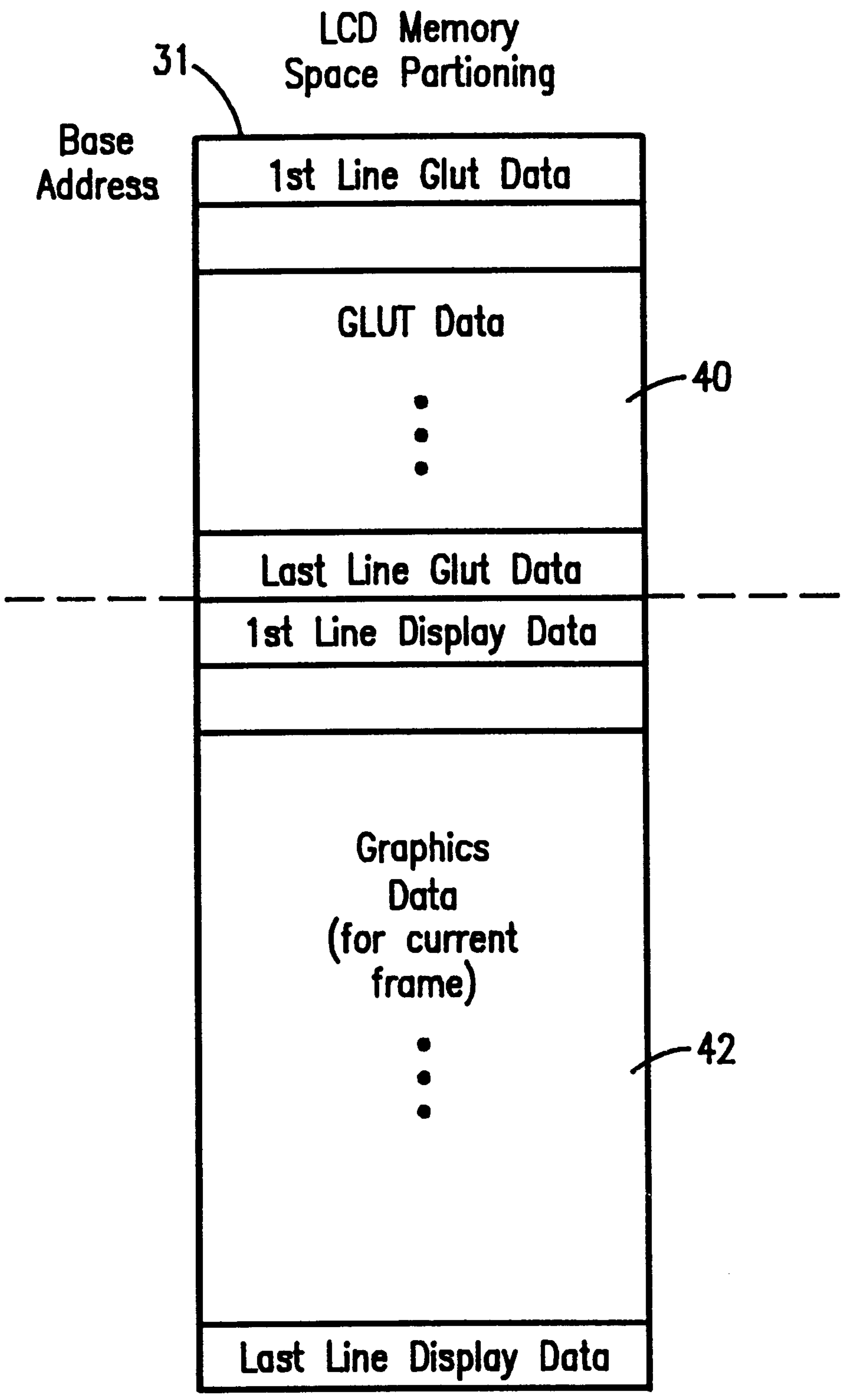
FIG. 5 is a block diagram illustrating the partitioning of an external memory that may be used with the display controller shown in FIG. 1.

Referring to FIG. 5, the GLUT data 40 and the graphics data 42 may both be stored in the shared system memory 31. In this scenario, the GLUT data 40 may begin at the base address followed by the graphics data 42 for the current frame. It should be well understood however, that storing the GLUT data 40 and the graphics data 42 together in the shared system memory 31 is not a requirement of the present invention. Specifically, the GLUT data 40 may be stored in its own dedicated memory or be part of some other memory that does not include the graphics data 42. The important feature is that the GLUT data 40 is stored in a memory which is external to the display controller 30. The memory in which the GLUT data 40 is stored may be located inside or outside of the dashed line 37 in FIG. 1. If the memory is located inside the dashed line 37, and the dashed line 37 represents that all of the components therein are integrated into a single IC 37, then the memory may also be integrated therein. In this scenario, the GLUT data 40 would still be external to the display controller 30.

Whether or not the GLUT data 40 is stored in the shared system memory 31 or its own memory, the display controller 30 maintains a programmable gray scale modulation scheme in that memory. The gray scale levels are programmable frame-by-frame, which is a feature that most conventional LCD controllers do not have. Programmability of the gray scale levels allows greater flexibility of the controller in interfacing with different displays, environmental conditions, and user preferences.

The display controller 30's gray scale modulation scheme has several benefits over previous controllers. First, as mentioned above, previous LCD controllers performed such temporal modulation by manipulating the graphics data with a fixed gray scale algorithm in hardware. Such fixed algorithms could not be updated or programmed. Second, there is greater efficiency in updating programmable gray scale modulation data in the display controller 30 than in the display controller with on-chip modulation data registers mentioned above. Since the GLUT data updates are performed to the GLUT data 40 stored in the external memory 31, versus an on-board memory, there is no interrupt to the display controller 30's standard data accesses of gray scale data 40 and graphics data 42. Also, the standard data accesses are not interrupted so no extra frame buffering is needed inside the display controller 30 to account for the delay. In some conventional controllers, new gray scale modulation data must be written by an external processor to the LCD controller every frame. In the display controller 30, several frames of GLUT data 40, e.g., up to 16 frames or more, can be stored in the system memory 31, thus allowing the display controller 30 to go through 16 frames of modulation data prior to needing an update of the memory by the CPU 33. In addition, since the designated number of frames of GLUT data 40, e.g., 16 frames, may be adequate for many purposes, some users may choose to loop through the 16 programmed words of GLUT data 40 without the CPU 33 updating them because the modulation may already be acceptable. The embodiment of the display controller 30 described herein permits a user to program from 2 to 16 words of GLUT data 40; it should be well understood, however, that the invention is not limited to 16 words of GLUT data 40 and is not limited to one word of modulation data per frame, but can be expanded or reduced as needed.

A third advantage of the display controller 30 over conventional controllers is that it has a greater capability in programming gray scale modulation for multiple frames with little or no impact on die size. Since the gray scale modulation data, i.e., GLUT data 40, is stored off-chip in an external memory 31, the only impact to the design in increasing the size of the programmable area is adding more word counts for the added gray scale memory space. On conventional controllers with on-board frame-by-frame gray scale modulation data, a larger memory space would have to be created on-chip for buffering extra frames of gray scale modulation data.

As mentioned above, the display controller 30 may use a shared system memory 31 approach to acquiring GLUT data 40 and graphics data 42, but such shared memory is not required. Furthermore, the display controller 30 is ideal for being implemented in a portable macro cell which can be easily integrated on chip with other macro functions, such as the IC 37 mentioned above. Although the shared memory 31 and the portable macro cell design are not requirements of the present invention, these features can be used for better cost and board space efficiency than conventional discreet LCD controller solutions which have a fixed hardware gray scale algorithm designed for a fixed screen model and which access graphics data through a dedicated video RAM. Such conventional controllers consume extra power and space (i.e. cost) on the system board. For example, high-end personal digital assistant (PDA) applications have limitations on space and power dissipation, and thus, could use the integrated, share system memory display controller 30 approach very efficiently.

Although not required, it will be assumed for the remainder of this discussion that the GLUT data 40 and the graphics data 42 may both be stored in the shared system memory 31. The number of words of GLUT data 40 designated in the system memory 31 may be specified by the display controller 30. In some cases, the GLUT data 40 can be the same for all data frames, and in other cases the GLUT data 40 may be dynamically updated by the external CPU 33. By way of example, one word of GLUT may be used for each frame; so, if 10 GLUT words are specified, then it will be 10 frames before the GLUT data will need to be updated by the external CPU 33. In the embodiment of the display controller 30 described herein, the size of the GLUT data 40 is programmable from 0–16 words by setting bits [1:4] of configuration register four (discussed below). It should be well understood, however, that either more or fewer than 16 words of GLUT data 40 may be designated in the system memory 31 (or whatever memory is used to store the GLUT data 40) in accordance with the present invention. Furthermore, it should be understood that more than one word of GLUT data 40 could be used per frame, or that the size of a GLUT word may be larger or smaller than 16 bits.

When the number of programmed GLUT words has been reached, an internal GLUT counter generates a CPU interrupt. This interrupt can be programmably turned off within the display controller 30 if periodic GLUT updating is not needed. If the interrupt is turned off, the current GLUT data 40 is continuously looped through from frame to frame.

Figure 6:
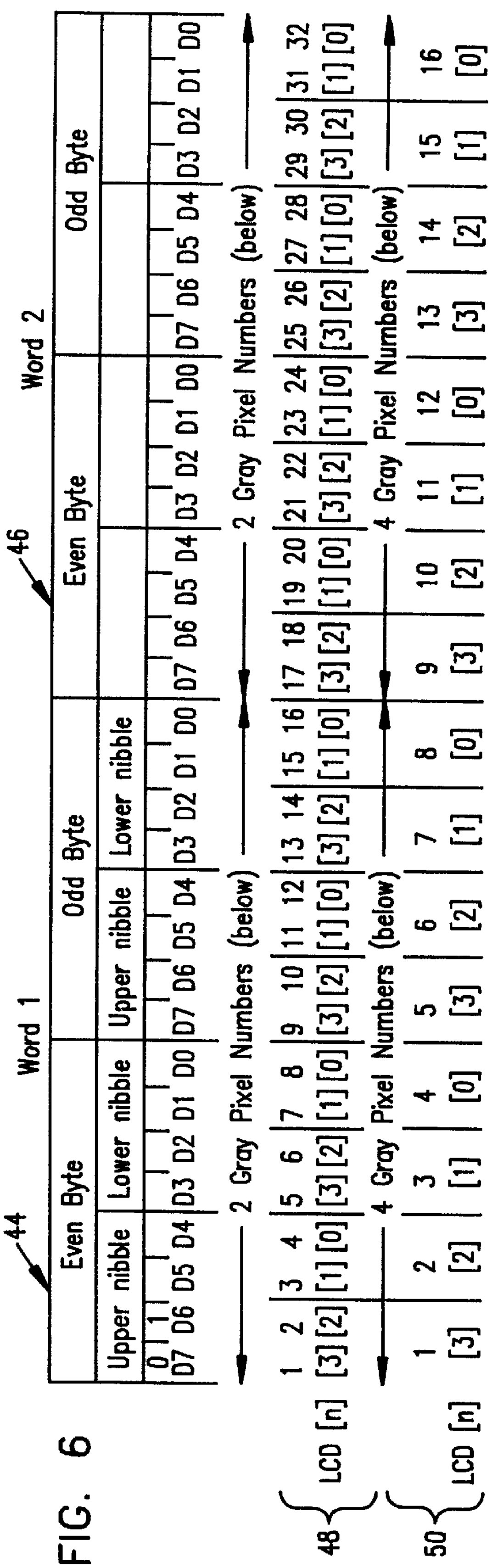
FIG. 6 is a block diagram illustrating two words of graphics data which may be stored in the external memory shown in FIG. 5.

Referring to FIG. 6, two words 44, 46 of graphics data 42 are shown. When the data is to be displayed in simple monochrome black (or blue) and white, each bit of each word 44, 46 translates into a single pixel in the display as indicated at 48. In other words, a one in the graphics data 42 translates into a full on pixel of either black or blue, and a zero in the graphics data 42 translates into a full off pixel, or a white pixel.

However, when simple monochrome is not sufficient, the display controller 30 also supports gray scale modulation of the graphics data 42. Although the display controller 30 is capable of generating many different shades of gray, the following discussion will assume that four shades of gray are generated. The four shades of gray are: OFF (black or dark), dark gray, light gray, and ON. A gray scale pixel map is used to modulate the various pixels. Gray scale pixels are turned on and off during successive frame scans. The rate in which they are turned on and off determines how dark or light they appear. As discussed above, because of the nature of LCD displays, this modulation is done in a temporal or time modulated way. Flickering is prevented by modulating adjacent pixels of the same gray value at different frequencies using phase delay. Pixels are modulated for gray-scale by presenting their data bits high and low in successive frame scans. Although the duty cycles are the same, adjacent or nearby gray pixels will not be modulated identically, a process referred to as spatial modulation. This accomplished by modulating even and odd rows differently, as well as by modulating each pixel of four adjacent pixels differently, as will be seen in FIG. 7.

In order to indicate which shade of gray is to be displayed, the graphics data 42 gray-scale values will be one of the following: 00=full bright, 01=light gray, 10=dark gray, 11=off. Thus, as indicated at 50 in FIG. 6, two bits of each word 44, 46 will be needed to generate one bit of the display data LCD[n]. If more than four shades of gray are used, then three or more bits of each word 44, 46 may be needed to generate one bit of the display data LCD[n].

The full bright value, 00, is mapped directly to a pixel value of 0; thus, when the graphics data 42 indicates a full bright value, i.e., 00, a 0 will always be sent on the appropriate line of the display data LCD[n]. Similarly, the off value, 11, is mapped to a pixel value of 1. The pixel values of light and dark gray, 01 and 10, respectively, are determined by a GLUT data 40 word, one of which is shown in FIG. 7. The gray scale is achieved through modulation of the applied voltage pulses to the display 32. Since adjacent pixels are preferably not modulated in exactly the same way so that they will not blink in sync, or unwanted flickering may occur, an odd and even mapping scheme is used. For example, for a dark gray pixel on an even row, certain bits will be used to determine the graphic value. For a dark gray pixel on the next odd row, different bits will be used to determine the graphic value. In this way, no two consecutive rows will be modulated exactly the same. However, the frequencies can be the same for the next even row because no flickering will be perceived by the eye with the rows separated by another row (in space and in time). Furthermore, each pixel in a grouping of four adjacent pixels on one row is modulated differently. This is illustrated in FIG. 7 by there being four different decode bits for the even row dark gray decode nibble, four different decode bits for the even row light gray decode nibble, four different decode bits for the odd row dark gray decode nibble, and four different decode bits for the odd row light gray decode nibble. The exact values of the gray scale pixel which will be sent on the display data lines LCD[3:0] are determined by using a GLUT word decoding map, shown in FIG. 8, which illustrates that the table values are normally varied for even and odd rows.

Figure 9:
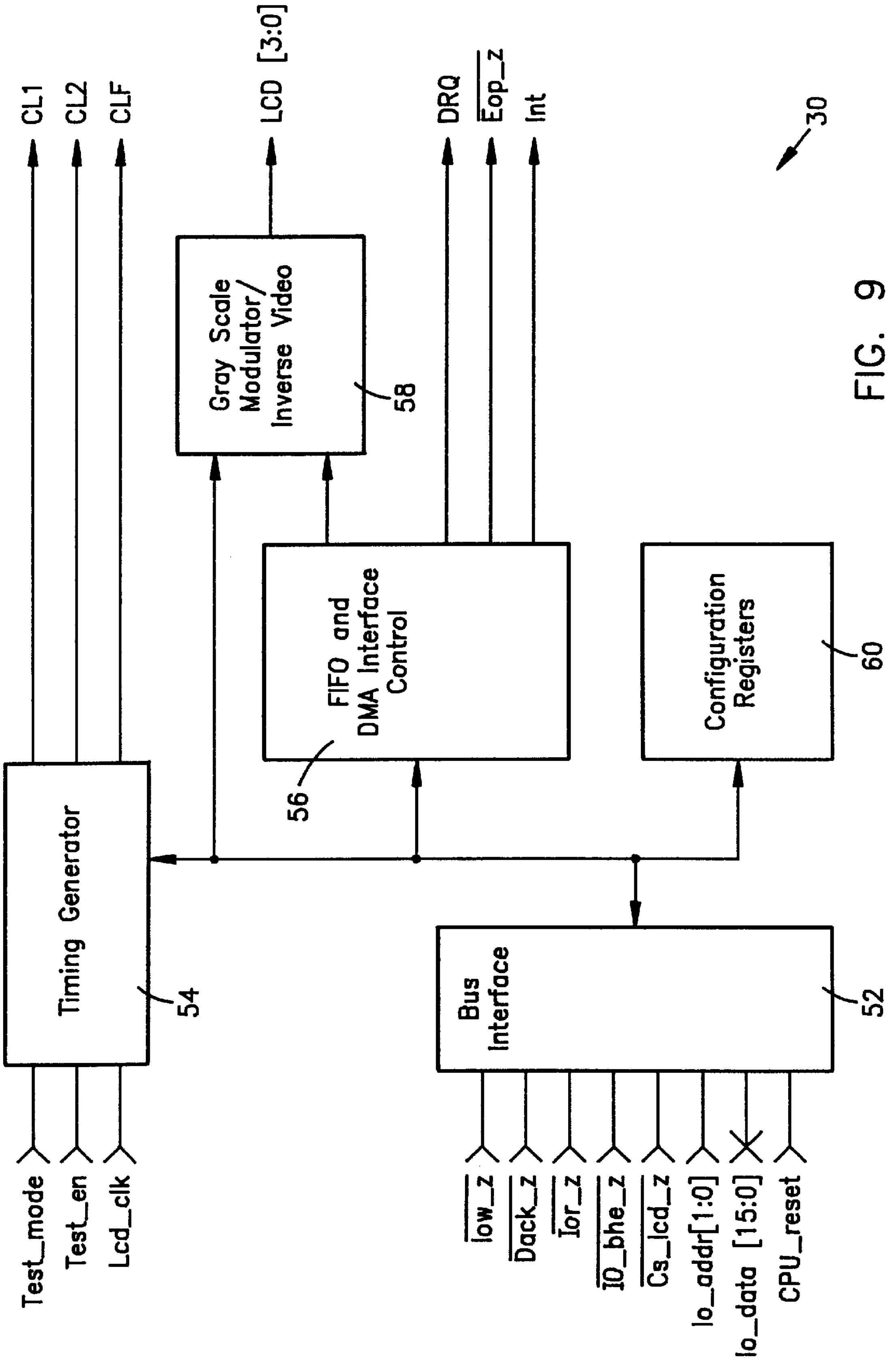
FIG. 9 is a more detailed block diagram illustrating the display controller shown in FIG. 1.

Referring to FIG. 9, the display controller 30 includes a bus interface 52, a timing generator 54, a FIFO (first-in-first-out) register and DMA interface control 56, a gray scale modulator 58, and a configuration register block 60. In general, the timing generator 54 contains all of the decoders and counters that generate the CL2, CL1, and CLF clocking signals and blink pulse clocking. The FIFO register and DMA interface control 56 controls the FIFO read and write addresses, FIFO read and write command strobes, FIFO depth and threshold decoders, maintains the FIFO read address and write address difference up-down counter (used for LCD DMA DRQ handling), generates the word clock (for FIFO reads and for data shifting in the gray scale modulator 58), and FIFO empty procedures. The FIFO register and DMA interface control 56 also generates the control signals for DRQ and $\overline{\text{Eop\_z}}$ assertion and desertion, the DRAM GLUT counter, GLUT size decoder, and the next frame GLUT position pointer, incoming graphics data indication, and the graphics data $\overline{\text{Iow\_z}}$ counter (for $\overline{\text{Eop\_z}}$ assertion handling). The gray scale modulator 58 generates the display data LCD[3:0], controls gray-scale modulation, display blinking, reverse video, and data output enabling. The configuration register block 60 contains all of the configuration registers for the controller, interrupt handler, and the data steering logic for reading back the contents of the configuration registers.

The specific function of the signals shown in FIG. 9 are as follows: $\overline{\text{Cpu\_reset\_z}}$ is a system reset input, Cs_lcd is a bus interface chip select input for the lcd controller block, $\overline{\text{Dack\_z}}$ is a DMA acknowledge indication input, Io_addr [1:0] is a bus interface address bits 1–0 input, Io_bhe_z is a bus interface byte high enable input, $\overline{\text{Iow\_z}}$ is a bus interface read strobe input, $\overline{\text{Iow\_z}}$ is a bus interface write strobe input, Lcd_clk is an LCD clock input referenced to 1× an external oscillator frequency, Test_en is an external test enable input for the display controller, Test_mode is an external test mode input for the display controller, Io_data [15:0] is a bidirectional peripheral data bus, CL1 is the display row selection pulse output, CL2 is the display dot clock (column clock) output, CLF is the display frame pulse output, LCD[3:0] is the display data output, Drq is a DMA request indication output, $\overline{\text{Eop\_z}}$ is a DMA end of process indication output, and Int is a display controller interrupt indication output.

Figure 10A:
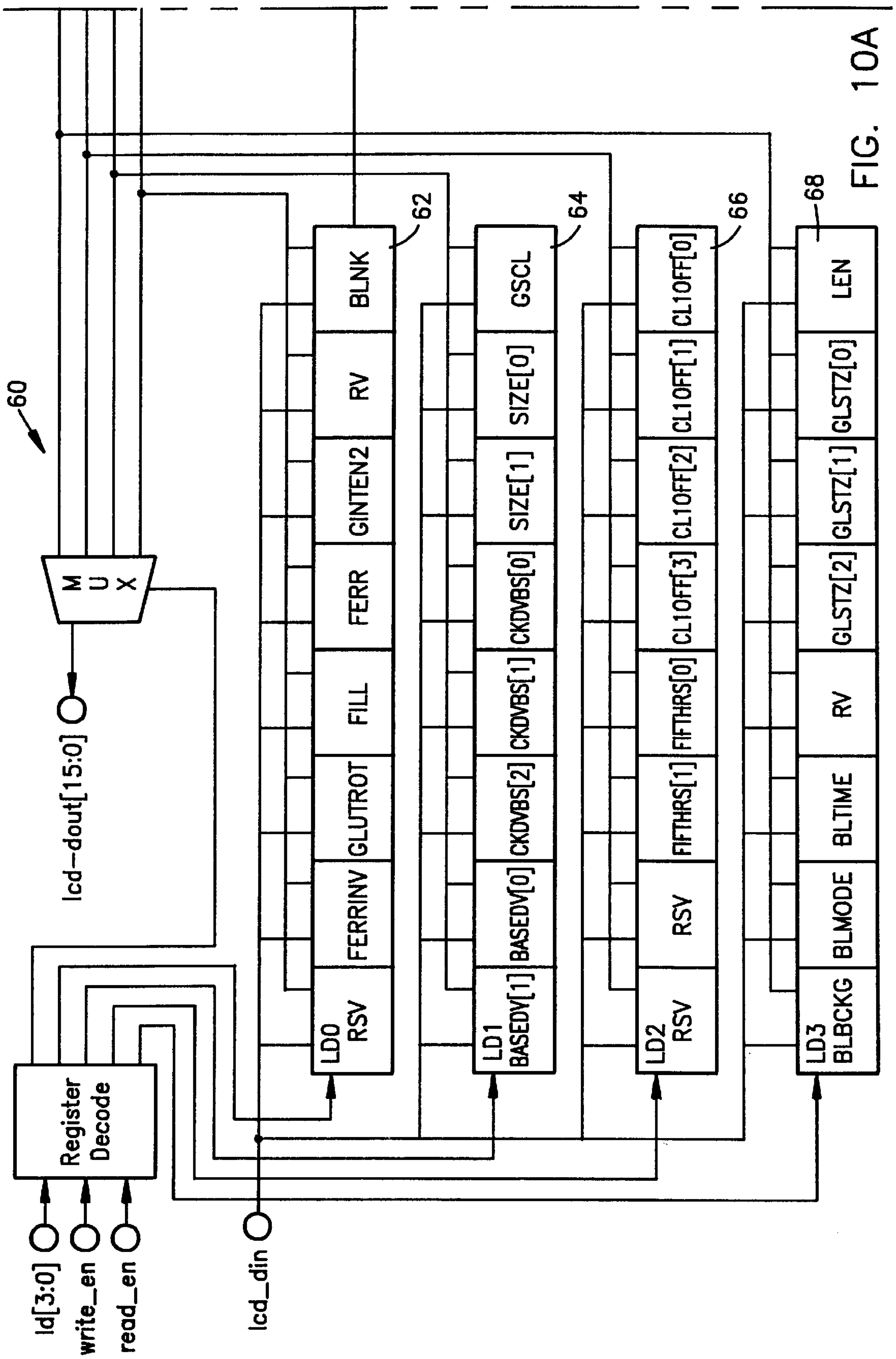
FIG. 10 comprising 10A and 10B is a block diagram illustrating the configuration register block shown in FIG. 9.

Referring to FIG. 10, the configuration register block 60 preferably includes four configuration registers that control the operation of the display controller 30 and provide status information to an external CPU: configuration register one 62, configuration register two 64, configuration register three 66, and configuration register four 68. Some bits are "set once and leave alone," while others can be set dynamically (on-the-fly). Specifically, the interrupt indication and enabling, dot clock CL2 divisors, dot clock CL2 offsets, reverse video, and blinking rates can be updated on-the-fly. Updatable bits are bits [7:3] of configuration register two 64, (controlling the dot clock CL2 divisors), bits [3:0] of configuration register three 66, (controlling the row pulse clock CL1 offset for adjusting the refresh rate), and bits [7:5] of configuration register four 68 (controlling inverse video and blink rates). Furthermore, it should be noted that the GLUT data 40 size, screen size, number of gray scales, and FIFO threshold level are fixed after LCD enabling.

Referring to configuration register one 62, bit [6], FERRINV, is a FIFO error interrupt disable selection bit. A "1" disables FIFO empty interrupt. Reset forces this bit to a "0". Bit [5], GLUTROT, is a fixed GLUT word rotation selection bit. A "1" enables the rotation of the current GLUT word. No new GLUT words are loaded into the current GLUT register when this mode is enabled. At the beginning of each new frame, the even row nibble portions of the GLUT word are shifted right and the odd row nibble portions are shifted left. Reset forces this bit to a "0". Bit [4], FILL, is a GLUT interrupt status bit. A "1" indicates that the external memory (e.g., a DRAM) GLUT entries should be updated. Reset forces this bit to a "0". Bit [3], FERR, is a FIFO interrupt status bit. A "1" indicates that the FIFO has run dry. Reset forces this bit to a "0". Bit [2], GINTENZ, is a GLUT update interrupt disabling selection bit. A "1" disables the interrupt for signaling DRAM GLUT entry updates. Reset forces this bit to a "0". Bit [1], RV, is a reverse video enable selection bit. A "1" enables reverse video images on the LCD screen. Reset forces this bit to a "0". Bit [0], BLNK, is a blink enable selection bit. A "1" enables blinking images on the LCD screen. Reset forces this bit to a "0".

Referring to configuration register two 64, Bits [7:6], BASEDV[1:0], are the binary clock division of basis selection for controlling the dot clock CL2 divisors. Reset forces these bits to "0". FIG. 11A illustrates the binary division which results from the various settings of these bits. Bits [5:3], CKDVBS[2:0], are the integer clock division of basis selection. Reset forces these bits to "0". FIG. 11B illustrates the integer division which results from the various settings of these bits. Bits [2:1], SIZE[1:0], are the screen size selection. Reset forces these bits to "0". FIG. 11C illustrates the settings of these bits for the various screen sizes. Bit [0], GSCL, is the 1 or 2 bit per pixel selection. A "1" sets a 2 bit per pixel gray scale encoding, and a "0" sets a 1 bit per pixel gray scale encoding. Resets forces this bit to a "0".

Referring to configuration register three 66, Bits [7:6] are reserved. Bits [5:4], FIFTHRS[1:0], set the fraction that the FIFO may empty before a DREQ is generated. Reset forces these bits to "0". FIG. 12 illustrates the FIFO fill thresholds which result from the settings of these bits. Bits [3:0], CLIOFF[3:0], set the row pulse clock CL1 offset after the last dot clock CL2. A single offset is equal to one period of the CL2 clock. The number of offsets is equal to the binary equivalent of CL1OFF[3:0]+1. This provides for a range of 1 to 16 offsets. Reset forces these bits to "0".

Referring to configuration register four 68, Bit [7], BLBCKG, is the background shade selection bit for blinking. A "1" sets the background shade to "1", and a "0" sets the background shade to "0". Reset forces this bit to a "0". Bit [6], BLMODE, sets the blink to inverse video or background selection bit. A "1" sets blink to inverse video, and a "0" sets blink to the background shade. Bit [5], BLTIME, sets the period of the blink selection bit. A "1" sets the blink period to 72 frames (50/50 duty cycle), and "0" sets the blink period to 36 frames (50/50 duty cycle). Reset forces this bit to a "0". Bit [4] is reserved. Bit [3:1], GLSIZ[2:0], sets the GLUT table size in external memory (e.g., DRAM) from 0–16 words. The table size is selected by the value of GLSIZ[2:0] (possible values are: 0,2,4,8,10,12,14, and 16). Reset forces these bits to "0". Bit [0], LEN, is the display controller enable selection bit. A "1" enables the controller (clock and data lines are active), and a "0" disables the controller (clocks and data lines are held low). Reset forces this bit to a "0".

Figure 13A:
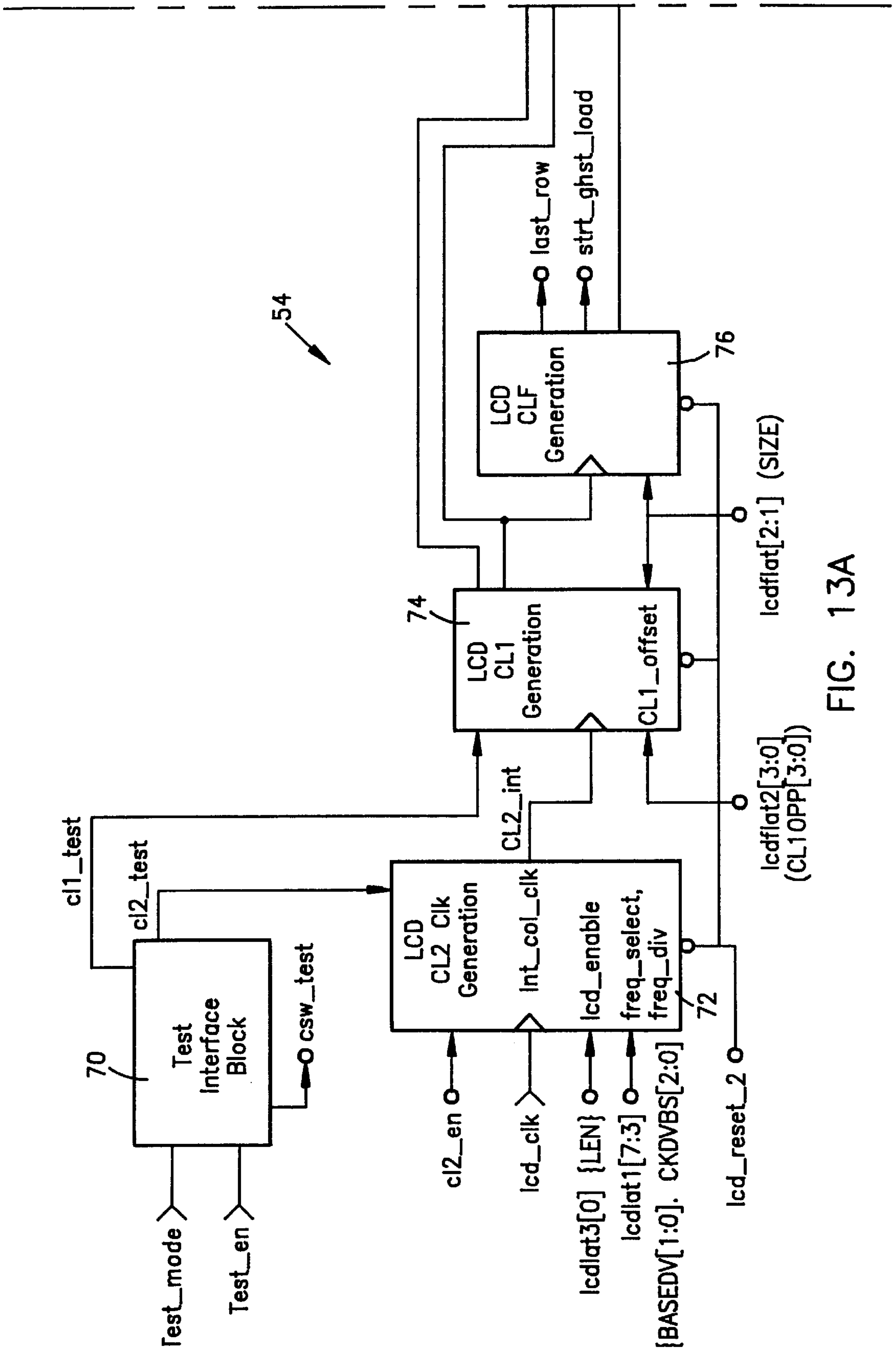
FIG. 13 comprising 13A and 13B is a block diagram illustrating the timing generator shown in FIG. 9.
Figure 13B:
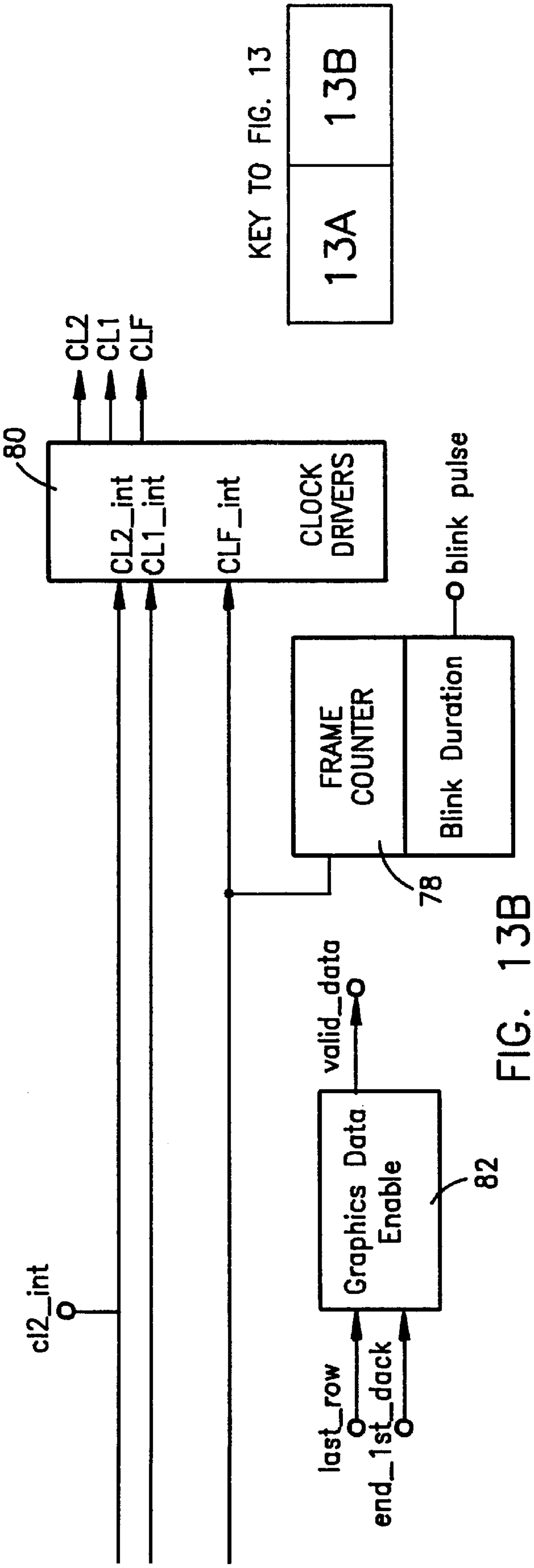

Referring to FIG. 13, the timing generator 54 includes a test interface block 70, a CL2 generation block 72, a CL1 generation block 74, a CLF generation block 76, a frame counter 78, clock drivers 80, and a graphics data enable 82. In general, the dot clock CL2 having whatever frequency is required by the LCD display 32 is obtained by dividing down an external system clock Lcd_clk. Using the data from the clock frequency configuration registers (i.e., configuration registers two 64 and three 66), user software sets an appropriate divisor to obtain the required frequency. The clock divisor can be programmed on the fly, permitting use with different screens, and letting the programmer easily optimize the screen frequency for the specific display screen being used. The ability to program on the fly allows the programmer to visually see the results of changes in the programming.

The timing generator 54 includes three stages of input clock processing to generate a targeted frame rate. The CL2 generation block 72 includes the first two stages of processing. Specifically, the CL2 generation block 72 receives the Lcd_clk signal which is a clock input referenced to 1× an external oscillator frequency. The first stage of processing is standard binary clock division (i.e. 2, 4, 8). As mentioned above, the binary clock division is controlled by Bits [7:6], BASEDV[1:0], of configuration register two 64. The second stage of processing is a 50/50 duty cycle prime/odd integer clock division of the result from the first stage of processing (i.e. 1, 2, 3, 5, 7, 9 . . . ). Bits [5:3], CKDVBS[2:0], of configuration register two 64 control the integer clock division. The output of the second stage of processing is a clock signal referred to as CL2_int ("CL2 internal"). The signal CL2_int is identical to the dot clock CL2, except that CL2_int is not masked by the programmed "unseen" dot clock CL2 offset times used for fme tuning the frame rate, and thus, maintains a continuous duty cycle.

The programmed "unseen" dot clock offset times are used to mask CL2_int, to form the dot clock CL2, during the third stage of input clock processing, which occurs in the CL1 generation block 74. In the third stage of processing, the "unseen" dot clock CL2 offset times are generated prior to the generation of a row pulse CL1. These offset times add a configurable amount of delay measured in the number of "unseen" dot clocks CL2 prior to the generation of a row pulse CL1. This offset time accumulates within a frame and is used for fine tuning the resulting frame rate. Thus, the row pulse CL1 is generated after a fixed number of dot clock CL2 pulses and the programmed offset, i.e., "unseen" dot clock CL2 times.

During operation, the signals CL1, CL2, and CLF are held low when the display controller 30 is disabled. The dot clock CL2 frequency is set by programming the binary and integer clock division levels in configuration register two 64. The frame rate is fine tuned by programming the number of "unseen" dot clock CL2 offset pulses in the row pulse CL1 via configuration register three 66. The timing generator 54 decoders are immediately supplied this information (i.e., asynchronously) until the first dot clock CL2 cycle after enabling the display controller 30. When the display controller 30 is enabled, the signals CL1, CL2, and CLF are enabled after two Lcd_clks on falling edge of the next Lcd_clk. After the controller is enabled the dot clock CL2 may be modified "on the fly" by reprogramming the binary and integer clock division levels. Similarly, the frame rate may be fine tuned on the fly by programming the number of dot clock CL2 periods of CL1 pulse offsets. This allows the frequencies of the clocks to be modified while the display controller 30 is enabled to ease the process of determining optimum frame rate. The timing generator 54 decoders are synchronously updated with information after the first dot clock CL2 cycle, using de-glitch circuity. Thus, the signals CL1, CL2, and CLF can be changed to new frequencies with no glitching.

Figure 14:
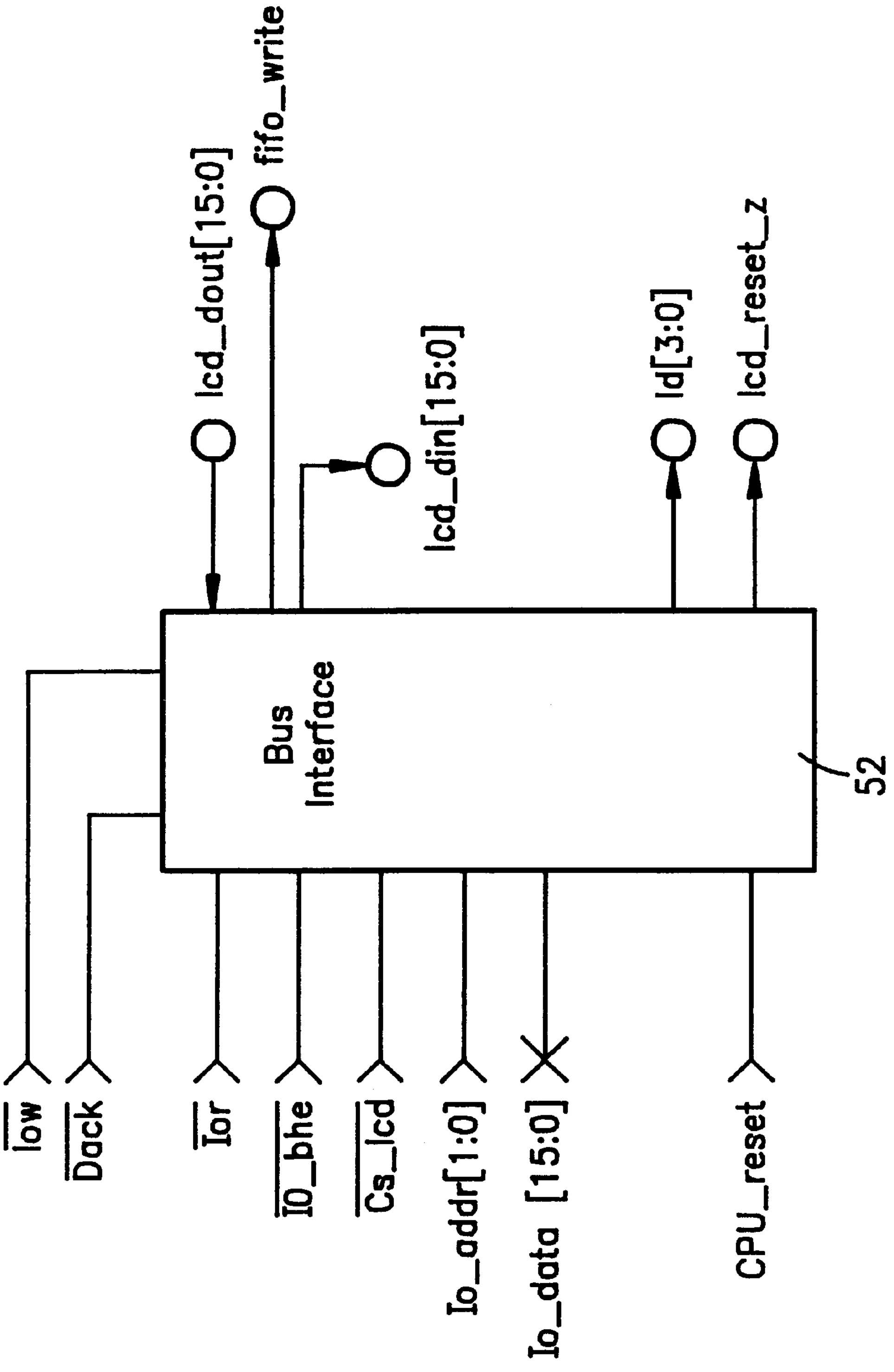
FIG. 14 is a block diagram illustrating the bus interface shown in FIG. 9.
Figure 15A:
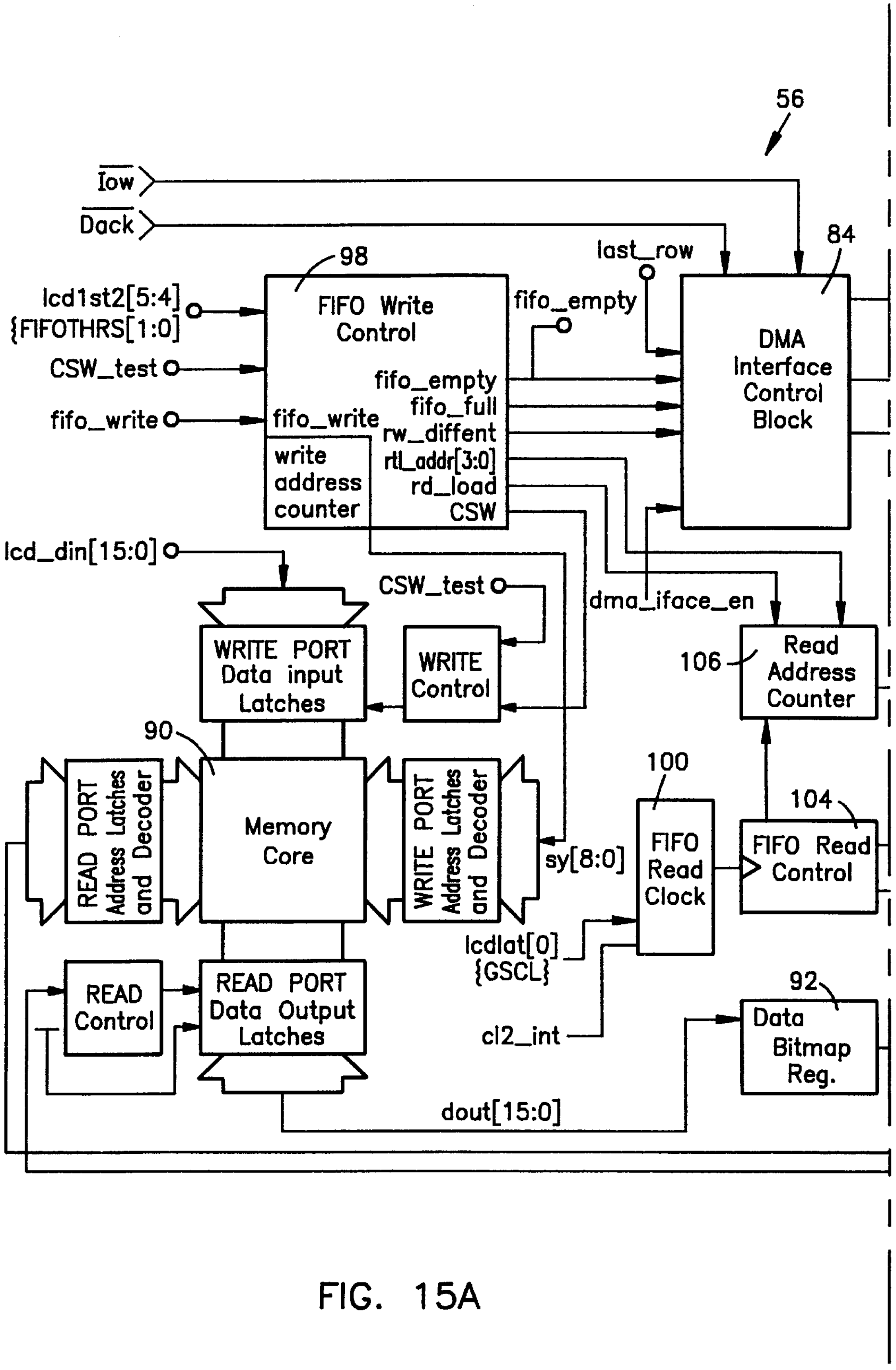
FIG. 15 comprising 15A and 15B is a block diagram illustrating the FIFO and DMA interface control shown in FIG. 9.
Figure 15B:
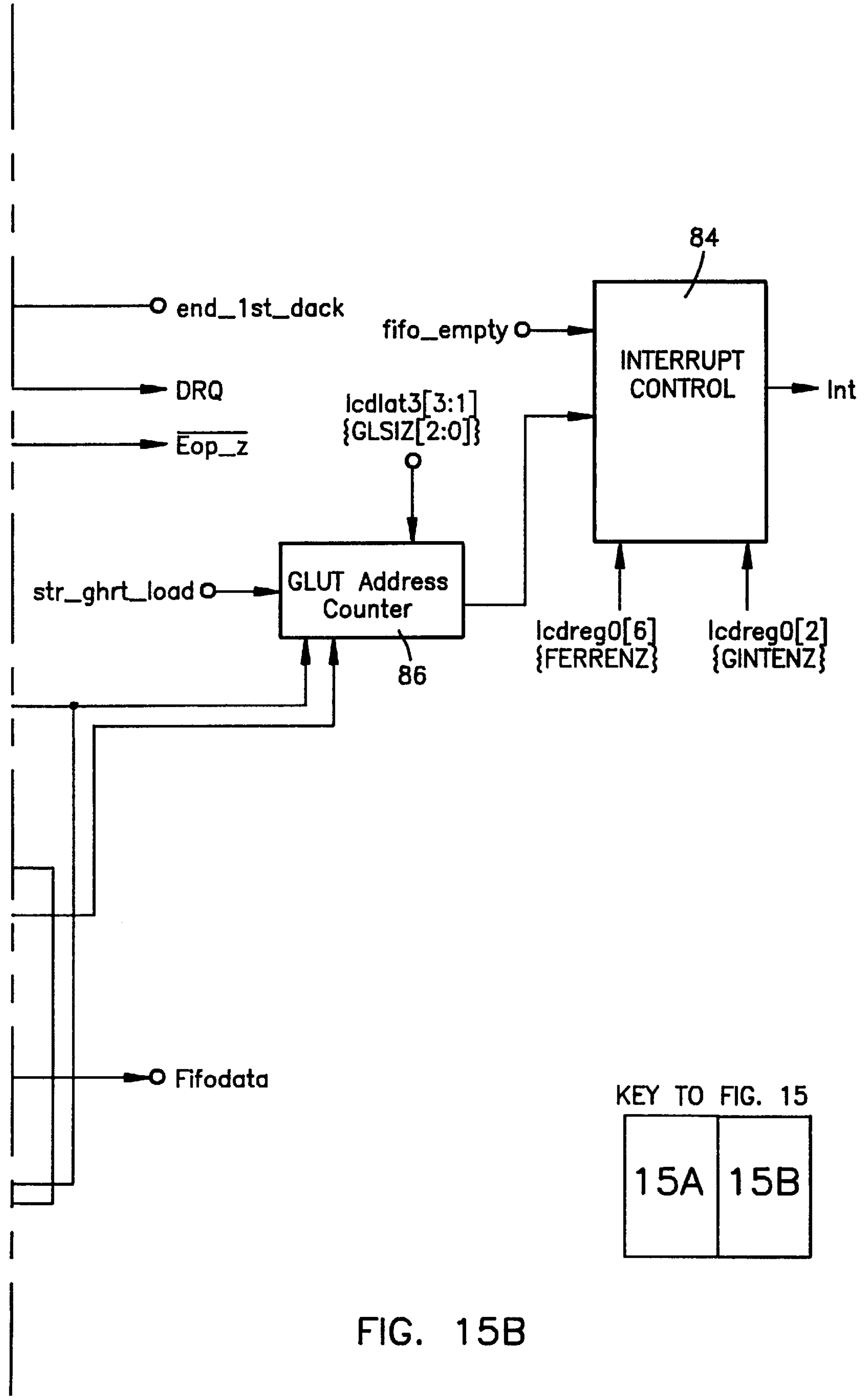
Figure 16:
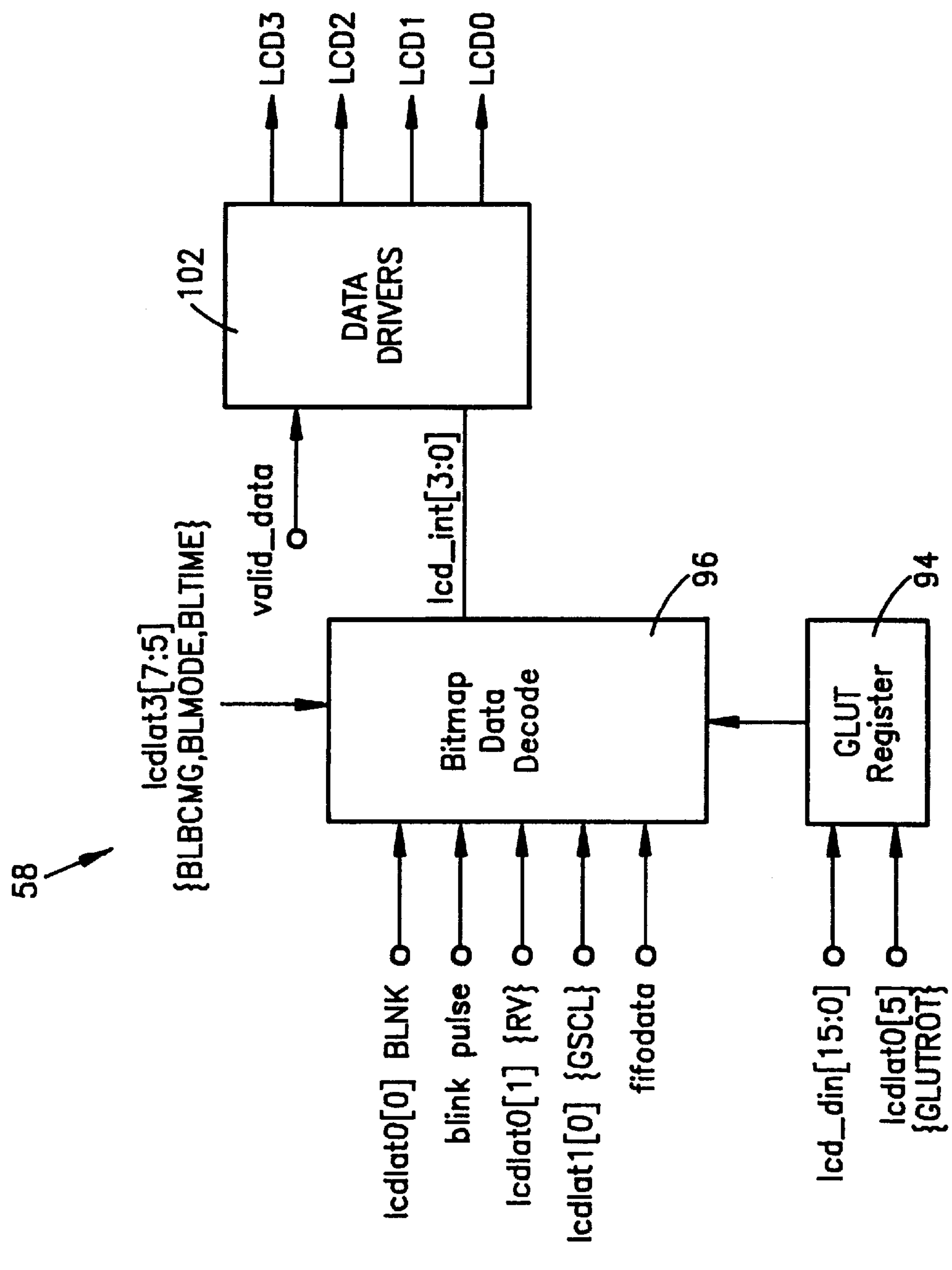
FIG. 16 is a block diagram illustrating the gray scale modulator/inverse video shown in FIG. 9.

Referring to FIGS. 14 through 16, the bus interface 52 is connected to a data bus Io_data[15:0]. The data bus Io_data [15:0] is connected to the external DMA controller 35 which coordinates the transfer of data and instructions between the display controller 30 and the external memory 31 and the CPU 33. A DMA interface control block 84 generates the DRQ and $\overline{\text{Eop\_z}}$ signals for the external DMA controller 35. The bus interface 52 provides data to the rest of the display controller 30 via the data bus lcd_din[15:0]. Specifically, the data bus lcd_din[15:0] is connected to a FIFO memory core 90 and a GLUT register 94. The FIFO memory core 90 is controlled by a FIFO write control 98, a FIFO read control 104, and a FIFO read clock 100. The GLUT register 94 interfaces with a bitmap data decode 96 which interfaces with data drivers 102 to generate the display data LCD[3:0].

The display controller 30 uses DMA transfers to transfer GLUT data 40 from the external memory 31 to the GLUT register 94 and graphics data 42 from the external memory 31 to a FIFO memory core 90. The DMA channel may be configured in demand mode, $\overline{\text{Eop\_z}}$ auto-initialization, and with IO write word transfers to the display controller 30 slave with zero wait states. Data access from the external memory 31 is done across the data bus Io_data[15:0] through the external DRAM controller 45 and the DMA controller 35. Preferably, the display controller 30 is I/O mapped, and therefore, it does not maintain the address of the current graphics data 42; this is done by the DMA controller 35. Since the FIFO memory core 90 holds limited amount of graphics data 42, it needs occasional refilling. The threshold limit at which the FIFO memory core is refilled is variable.

Data transfer from the external memory 31 begins with GLUT data 40 followed by the graphics data 42 for the current frame. Specifically, on the first DMA transfer to the display controller 30, the data coming into the display controller 30 will be the GLUT data 40, except for the case where zero GLUT words are programmed which would be the case for display applications with only two gray levels (i.e., on and off, only). The GLUT words coming into the display controller 30 will be counted and only the word used for modulation of the next frame will be stored. It is identified by a GLUT word address counter 86 that is automatically incremented each new frame. When the GLUT counter 86 reaches the number of GLUT words programmed, an interrupt control block 88 generates an interrupt to signal the external CPU 33 to update the GLUT data 40 in the system memory 31. By way of example, if each frame is specified to be at least 13.6 ms long (at a 73.5 Hz frame rate), then, assuming that a 16 word GLUT data 40 space has been allocated, the GLUT update interrupt would occur at least every 218 ms. This interrupt can be disabled within the display controller 30 should the current GLUT programming be adequate for an extended time. While one word of GLUT decoding data per frame may be sufficient, the display controller 30 can work with two or more GLUT words per frame.

The GLUT data 40 is accessed from the first external memory 31 word locations pointed to by the base address stored in the DMA channel's base address register. Initially, at display controller 30 enabling, the current and next frame's GLUT data 40 is loaded into the GLUT register 94. Upon initialization of the display controller 30, both the current and next frame's GLUT words are loaded into the GLUT word storage registers during the first two DMA $\overline{\text{Iow\_z}}$ accesses. All other GLUT accesses to the external memory 31 after initialization will be for the next frame's GLUT word.

The GLUT word for the current frame is transferred to a GLUT register 94 where it is used for gray scale modulation in a bitmap data decoder 96. As discussed above, the GLUT word is comprised of two light gray and two dark gray nibbles of data, where one nibble is for odd rows and the other for even rows. The nibble data stores the value (1 or 0) that should be placed on the LCD[3:0] data ports for that shade.

After an EOP cycle is complete (a DMA transfer complete signal), the next DMA access will start at the beginning of the display controller 30's memory space where the next frame's GLUT data 40 will be loaded into the GLUT register 94. The next DMA access after an EOP will start at the base address previously loaded when DMA auto-initialization is being used.

Figure 17:
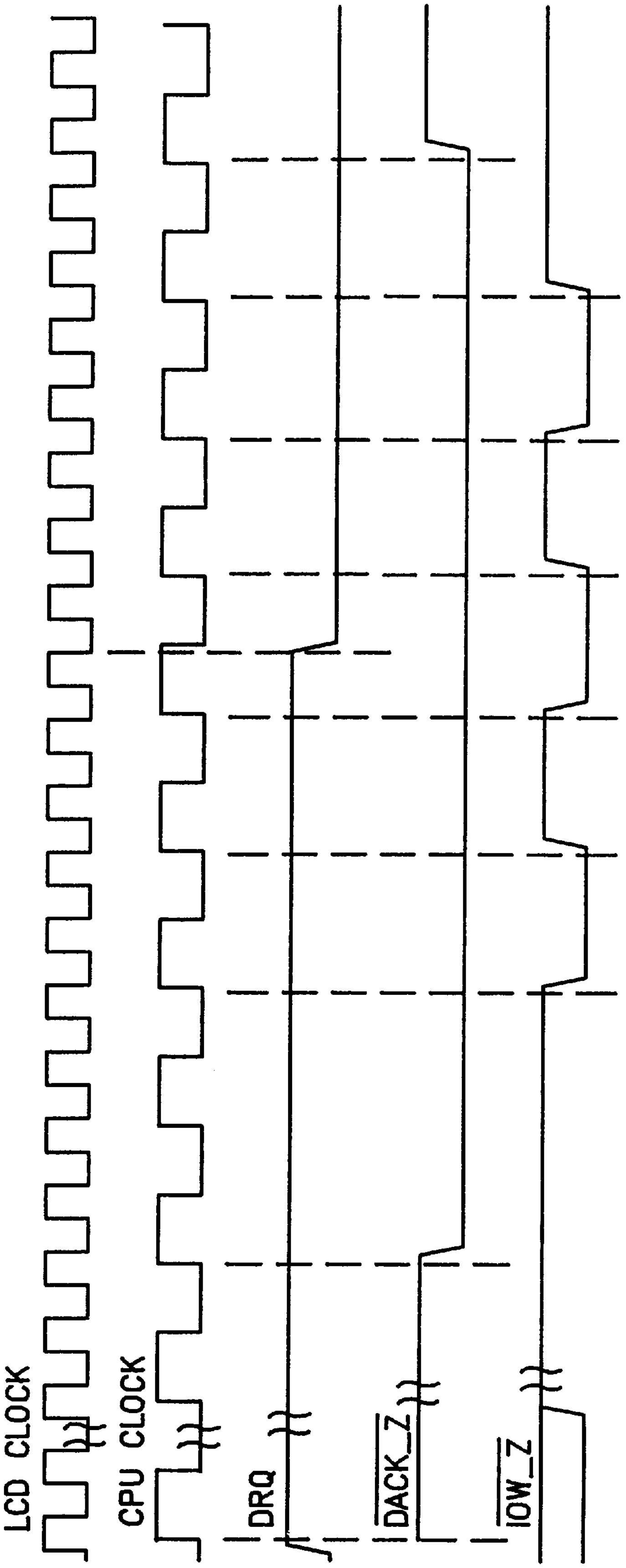
FIGS. 17–19 are timing diagrams illustrating the operation of display controller shown in FIG. 1.
Figure 18:
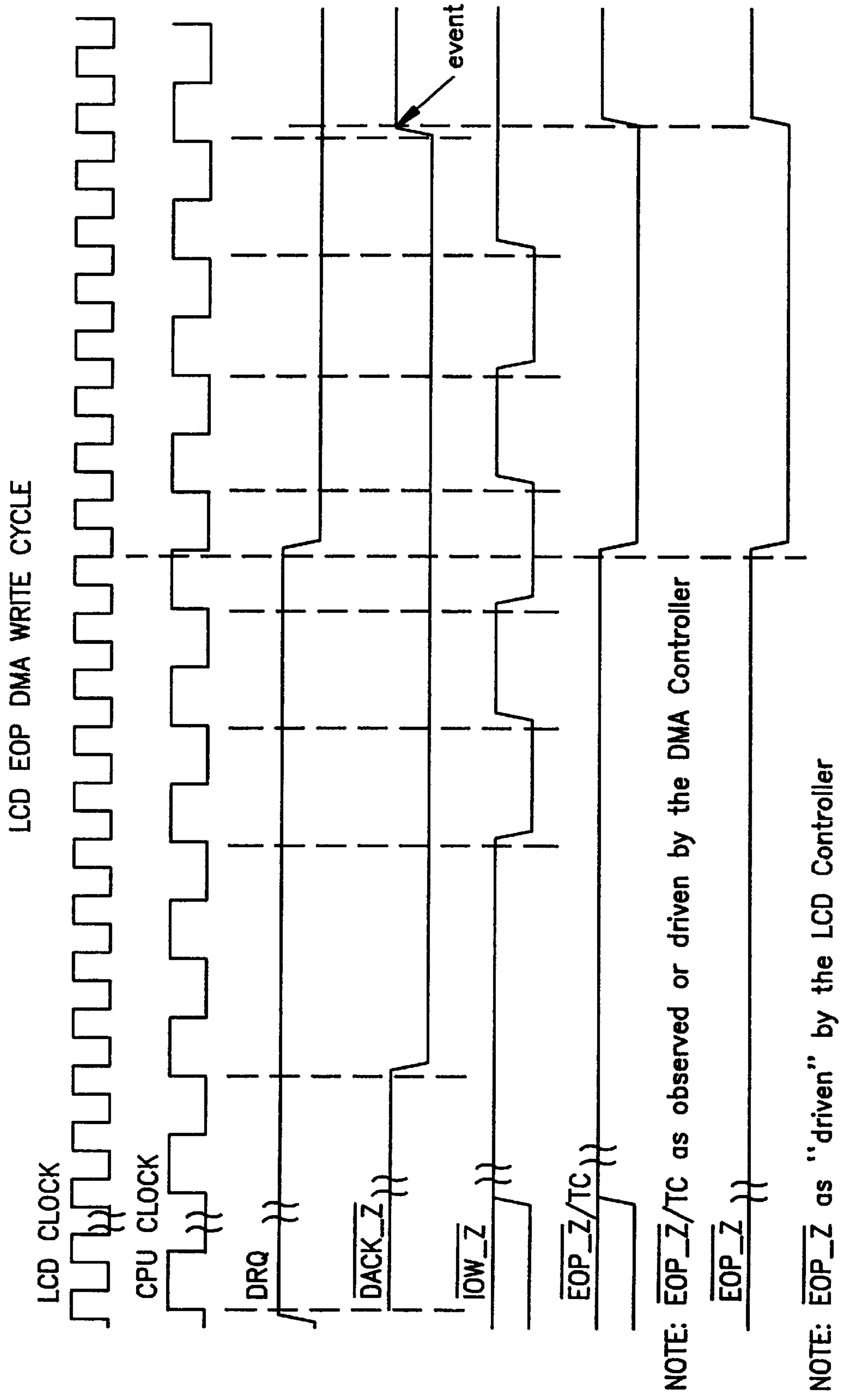
Figure 19:
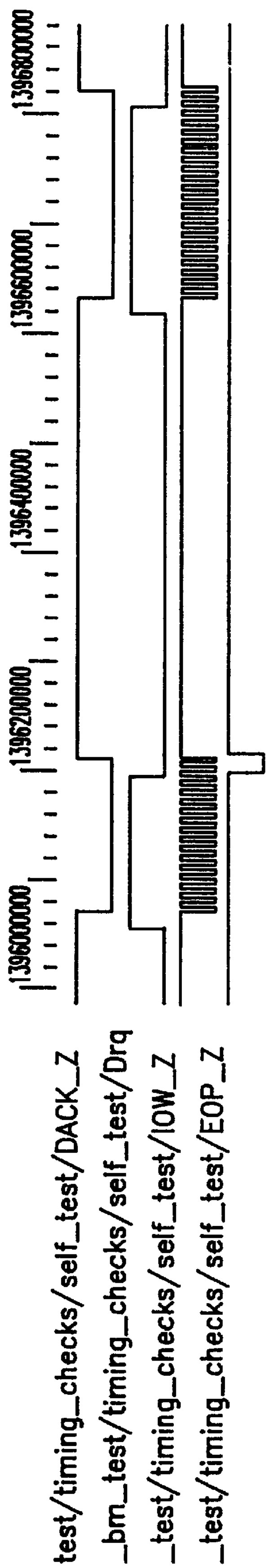

Referring to FIGS. 17–19, the FIFO and DMA initial cycles are performed as follows. After RESET/disable, the FIFO read and write address are set to 00H in the FIFO write control block 98. The display controller 30 DMA channel, GLUT size, screen size, FIFO fill threshold level, and number of gray scales are programmed. The display controller 30 is then enabled. DRQ is forced active after the first lcd_clk sampled edge of lcd_en. The first $\overline{\text{Dack\_z}}$ and first $\overline{\text{Iow\_z}}$ are started. An initialization pulse is created that is used by DMA interface control block 84 to load the GLUT count, and prepares one-time current and next frame GLUT loading. All $\overline{\text{Iow\_z}}$ cycles continue until the end of the first $\overline{\text{Dack\_z}}$. GLUT data 40 for current and next frame stored in the GLUT registers 94. The FIFO memory core 90 is filled to depth as controlled by the FIFO write control block 98.

After the GLUT is loaded, the FIFO write address is incremented in the FIFO write control block 98 after each write strobe for the initial loading of the FIFO memory core 90. In the DMA interface control block 84, the look_ahead write address is compared with the fifo_depth, and when equal, DRQ will be deasserted. After the first $\overline{\text{Dack\_z}}$ deassertion, the look_ahead write address is subsequently compared with the current read address. After the first $\overline{\text{Dack\_z}}$ deassertion, the end_1st_dack bit is set in the DMA interface control block 84. Then, when the lcd_ clockgen indicates the end of the frame by the signal equalrow, the signal valid_frame is set indicating to the data drivers 102 that it can start transmitting graphics data LCD[3:0].

After the initial cycles, the FIFO and DMA standard cycles are performed as follows. In general, the quantity of graphics data stored in the FIFO memory core 90 is monitored as its decreases. This monitoring is performed by the read address counter 106 which generates a read address used for reading the graphics data stored in the FIFO memory core 90, as well as a write address which is generated by the FIFO write control 98 which is used for writing to the graphics data stored in the FIFO memory core 90. The difference between the read address and the write address is computed by the FIFO write control block 98. When the difference between the read address and the write address falls below the FIFO threshold level, a FIFO read/write difference count signal rw_diffcnt is generated by the FIFO write control block 98. The DMA interface control block 84 generates a data request signal DRQ in response to the read/write difference count signal rw_diffcnt in order to initiate the transfer of more graphics data to the FIFO memory core 90. Graphics data is transferred to the FIFO memory core via DMA accesses. The FIFO write control block 98 monitors the quantity of graphics data in the FIFO memory core 90 as it increases. Specifically, the write address is compared to the read address, and when the write address is equal to one address position less than the read address, an end of process signal is generated by the DMA interface control block 84. The end of process signal stops the DMA from transferring graphics data to the FIFO memory core 90.

Specifically, DRQ is forced active after the read-write address difference count is equal to the FIFO threshold. $\overline{\text{Dack\_z}}$ is asserted during FIFO write cycles, and the look-ahead write address is compared with the current read address after each $\overline{\text{Iow\_z}}$ deassertion. When the comparison is equal, DRQ is deasserted and after one more $\overline{\text{Iow\_z}}$ cycle, $\overline{\text{Dack\_z}}$ is deasserted. In time, DRQ will be forced active again as defmed before. This cycle occurs throughout a frame. At the end of a frame memory, $\overline{\text{Eop\_z}}$ is generated by the controller during the last DMA access of the frame. The end of frame memory is determined by the DMA interface control block 84's dram_word_cnt counter which is decremented after each FIFO write. When this counter's value is equal to one, an $\overline{\text{Eop\_z}}$ is forced. The $\overline{\text{Eop\_z}}$ is generated by the DMA interface control block 84 following the loading of the next to last word of bit-map data (i.e., for the end of the row on line 240/200/320). After the $\overline{\text{Eop\_z}}$ is received by the DMA controller 35, the DMA removes $\overline{\text{Dack\_z}}$ after one more IOW_z cycle. The dram_word_cnt counter will then be loaded with the DRAM word count that corresponds to the graphics data 42 needed for the size screen being used and the number of gray scales. After $\overline{\text{Eop\_z}}$ is asserted, the DMA auto-initializes to the display controller 30 channel's base address.

The DMA access after the $\overline{\text{Eop\_z}}$ (auto_initialization) will obtain the GLUT word for the next frame (unless 0 GLUT words have been programmed) and then the beginning of graphics data. In the DMA interface control block 84, the look_ahead write address is compared with the current read address (i.e., data already read), and when equal, DRQ will be de-asserted. The display controller 30 can hold DRQ active during the time the DMA controller 35 is going through auto-initialization. Because the display controller 30 is released after sending out an EOP, a higher priority DMA slave can take over the DMA controller 35 after the display controller 30 is released even though DRQ is still active.

Should the FIFO memory core 90 go empty, then a FIFO error reset is issued which causes the FIFO and DMA interface control block 56 to begin back at initialization. The DMA controller 35 is forced to be auto-initialized after this occurs two times in succession. The display data lines LCD[3:0] will be forced low until a new valid frame begins. By way of example, using a 32×16 bit FIFO memory core 90, the maximum specified DRQ to $\overline{\text{Dack\_z}}$ bus latency for a 480×320 screen with 4 gray levels is 20 usec (for a 320×240 screen, 40 usec) for 2 bits per pixel gray scale and a 72 Hz frame refresh rate.

The data cycles and FIFO reads are performed as follows. After RESET/disable, the number of gray scales is programmed, then the display controller 30 is enabled. The display data lines LCD[3:0] will output zeroes until the FIFO write control block 98 runs the first fifo read cycle coinciding with the first rising edge of the dot clock CL2 at the beginning of the first valid frame. The gray scale modulator 58 will then begin to supply graphics data 42 to the LCD display 32 starting at the upper left-hand pixel. Graphics data 42 will continue to be sent to the LCD display 32 until the occurrence of a reset.

The invention embodiments described herein have been implemented in an integrated circuit which includes a number of additional finctions and features which are described in the following co-pending, commonly assigned patent applications, the disclosure of each of which is incorporated herein by reference: U.S. patent application Ser. No. 08/451,319, entitled "DISPLAY CONTROLLER CAPABLE OF ACCESSING AN EXTERNAL MEMORY FOR GRAY SCALE MODULATION DATA" (atty. docket no. NSC1-62700); U.S. patent application Ser. No. 08/451,965, entitled "SERIAL INTERFACE CAPABLE OF OPERATING IN TWO DIFFERENT SERIAL DATA TRANSFER MODES" (atty. docket no. NSC1-62800); U.S. patent application Ser.

No. 08/453,076, entitled "HIGH PERFORMANCE MULTIFUNCTION DIRECT MEMORY ACCESS (DMA) CONTROLLER" (atty. docket no. NSC1-62900); U.S. patent application Ser. No. 08/452,001, entitled "OPEN DRAIN MULTI-SOURCE CLOCK GENERATOR HAVING MINIMUM PULSE WIDTH" (atty. docket no. NSC1-63000); U.S. patent application Ser. No. 08/451,503, entitled "INTEGRATED CIRCUIT WITH MULTIPLE FUNCTIONS SHARING MULTIPLE INTERNAL SIGNAL BUSES ACCORDING TO DISTRIBUTED BUS ACCESS AND CONTROL ARBITRATION" (atty. docket no. NSC1-63100); U.S. patent application Ser. No. 08/451,924, entitled "EXECUTION UNIT ARCHITECTURE TO SUPPORT x86 INSTRUCTION SET AND x86 SEGMENTED ADDRESSING" (atty. docket no. NSC1-63300); U.S. patent application Ser. No. 08/451,444, entitled "BARREL SHIFTER" (atty. docket no. NSC1-63400); U.S. patent application Ser. No. 08/451,204, entitled "BIT SEARCHING THROUGH 8, 16, OR 32-BIT OPERANDS USING A 32-BIT DATA PATH" (atty. docket no. NSC1-63500); U.S. patent application Ser. No. 08/451,195, entitled "DOUBLE PRECISION (64-BIT) SHIFT OPERATIONS USING A 32-BIT DATA PATH" (atty. docket no. NSC1-63600); U.S. patent application Ser. No. 08/451,571, entitled "METHOD FOR PERFORMING SIGNED DIVISION" (atty. docket no. NSC1-63700); U.S. patent application Ser. No. 08/452,162, entitled "METHOD FOR PERFORMING ROTATE THROUGH CARRY USING A 32-BIT BARREL SHIFTER AND COUNTER" (atty. docket no. NSC1-63800); U.S. patent application Ser. No. 08/451,434, entitled "AREA AND TIME EFFICIENT FIELD EXTRACTION CIRCUIT" (atty. docket no. NSC1-63900); U.S. patent application Ser. No. 08/451,535, entitled "NON-ARITHMETICAL CIRCULAR BUFFER CELL AVAILABILITY STATUS INDICATOR CIRCUIT" (atty. docket no. NSC1-64000); U.S. patent application Ser. No. 08/445,563, entitled "TAGGED PREFETCH AND INSTRUCTION DECODER FOR VARIABLE LENGTH INSTRUCTION SET AND METHOD OF OPERATION" (atty. docket no. NSC1-64100); U.S. patent application Ser. No. 08/450,153, entitled "PARTITIONED DECODER CIRCUIT FOR LOW POWER OPERATION" (atty. docket no. NSC1-64200); U.S. patent application Ser. No. 08/451,495, entitled "CIRCUIT FOR DESIGNATING INSTRUCTION POINTERS FOR USE BY A PROCESSOR DECODER" (atty. docket no. NSC1-64300); U.S. patent application Ser. No. 08/451,219, entitled "CIRCUIT FOR GENERATING A DEMAND-BASED GATED CLOCK" (atty. docket no. NSC1-64500); U.S. patent application Ser. No. 08/451,214, entitled "INCREMENTOR/DECREMENTOR" (atty. docket no. NSC1-64700); U.S. patent application Ser. No. 08/451,150, entitled "A PIPELINED MICROPROCESSOR THAT PIPELINES MEMORY REQUESTS TO AN EXTERNAL MEMORY" (atty. docket no. NSC1-64800); U.S. patent application Ser. No. 08/451,198, entitled "CODE BREAKPOINT DECODER" (atty. docket no. NSC1-64900); U.S. patent application Ser. No. 08/445,564, entitled "TWO TIER PREFETCH BUFFER STRUCTURE AND METHOD WITH BYPASS" (atty. docket no. NSC1-65000); U.S. patent application Ser. No. 08/445,564, entitled "INSTRUCTION LIMIT CHECK FOR MICROPROCESSOR" (atty. docket no. NSC1-65100); U.S. patent application Ser. No. 08/452,306, entitled "A PIPELINED MICROPROCESSOR THAT MAKES MEMORY REQUESTS TO A CACHE MEMORY AND AN EXTERNAL MEMORY CONTROLLER DURING THE SAME CLOCK CYCLE" (atty. docket no. NSC1-65200); U.S. patent application Ser. No. 08/452,080, entitled "APPARATUS AND METHOD FOR EFFICIENT COMPUTATION OF A 486™ MICROPROCESSOR COMPATIBLE POP INSTRUCTION" (atty. docket no. NSC1-65700); U.S. patent application Ser. No. 08/450,154, entitled "APPARATUS AND METHOD FOR EFFICIENTLY DETERMINING ADDRESSES FOR MISALIGNED DATA STORED IN MEMORY" (atty. docket no. NSC1-65800); U.S. patent application Ser. No. 08/451,742, entitled "METHOD OF IMPLEMENTING FAST 486™ MICROPROCESSOR COMPATIBLE STRING OPERATION" (atty. docket no. NSC1-65900); U.S. patent application Ser. No. 08/452,659, entitled "A PIPELINED MICROPROCESSOR THAT PREVENTS THE CACHE FROM BEING READ WHEN THE CONTENTS OF THE CACHE ARE INVALID" (atty. docket no. NSC1-66000); U.S. patent application Ser. No. 08/451,507, entitled "DRAM CONTROLLER THAT REDUCES THE TIME REQUIRED TO PROCESS MEMORY REQUESTS" (atty. docket no. NSC1-66300); U.S. patent application Ser. No. 08/451,420, entitled "INTEGRATED PRIMARY BUS AND SECONDARY BUS CONTROLLER WITH REDUCED PIN COUNT" (atty. docket no. NSC1-66400); U.S. patent application Ser. No. 08/452,365, entitled "SUPPLY AND INTERFACE CONFIGURABLE INPUT/OUTPUT BUFFER" (atty. docket no. NSC1-66500); U.S. patent application Ser. No. 08/451,744, entitled "CLOCK GENERATION CIRCUIT FOR A DISPLAY CONTROLLER HAVING A FINE TUNEABLE FRAME RATE" (atty. docket no. NSC1-66600); U.S. patent application Ser. No. 08/451,206, entitled "CONFIGURABLE POWER MANAGEMENT SCHEME" (atty. docket no. NSC1-66700); U.S. patent application Ser. No. 08/452,350, entitled "BIDIRECTIONAL PARALLEL SIGNAL INTERFACE" (atty. docket no. NSC1-67000); U.S. patent application Ser. No. 08/452,094, entitled "LIQUID CRYSTAL DISPLAY (LCD) PROTECTION CIRCUIT" (atty. docket no. NSC1-67100); U.S. patent application Ser. No. 08/450,156, entitled "DISPLAY CONTROLLER CAPABLE OF ACCESSING GRAPHICS DATA FROM A SHARED SYSTEM MEMORY" (atty. docket no. NSC1-67500); U.S. patent application Ser. No. 08/450,726, entitled "INTEGRATED CIRCUIT WITH TEST SIGNAL BUSES AND TEST CONTROL CIRCUITS" (atty. docket no. NSC1-67600); U.S. patent application Ser. No. 08/445,568, entitled "DECODE BLOCK TEST METHOD AND APPARATUS" (atty. docket no. NSC1-68000).

It should be understood that various alternatives to the embodiments of the invention described herein may be employed in practicing the invention. It is intended that the following claims define the scope of the invention and that structures and methods within the scope of these claims and their equivalents be covered thereby.

What is claimed is:

1. A display controller, comprising:

a data bus interface configured to receive modulation data from a designated space in an external memory which is allocated to store modulation data;

a modulation data register coupled to the data bus interface and configured to receive a first quantity of modulation data through the data bus interface from the designated space in the external memory;

a decoder coupled to the modulation data register and configured to receive the first quantity of modulation data and to decode graphics data according to the first quantity of modulation data in order to generate display data; and a modulation data address counter coupled to the data bus interface and having an input configured to set a preprogrammed total quantity of modulation data which corresponds to a size of the designated space in the external memory which is allocated to store modulation data, the modulation data address counter configured to count quantities of modulation data that are transferred through the data bus interface and to generate a load modulation data signal when the preprogrammed total quantity of modulation data has been transferred through the data bus interface to indicate that the designated space in the external memory needs to be updated.

2. A display controller in accordance with claim 1, further comprising:

a configuration register, coupled to the input of the modulation data address counter, which is used to set the preprogrammed total quantity of modulation data.

3. A display controller in accordance with claim 1, further comprising:

a direct memory access (DMA) interface control block which generates a data request signal which is used to initiate transfer of the first quantity of modulation data through the data bus interface.

4. A display controller, comprising:

a data bus interface for transferring data to the display controller from external sources;

a modulation data register coupled to the data bus interface which receives a first quantity of modulation data through the data bus interface;

a decoder coupled to the modulation data register which receives the first quantity of modulation data and decodes graphics data according to the first quantity of modulation data in order to generate display data;

a modulation data address counter which counts quantities of modulation data that are transferred through the data bus interface and which generates a load modulation data signal when a preprogrammed total quantity of modulation data has been transferred through the data bus interface; and an interrupt generation circuit coupled to the modulation data address counter which generates a CPU interrupt in response to the load modulation data signal.

5. A display controller, comprising:

a data bus interface for transferring data to the display controller from external sources;

a direct memory access (DMA) interface control block which generates a data request signal which is used to initiate transfer of a first quantity of modulation data through the data bus interface;

a modulation data register coupled to the data bus interface which receives the first quantity of modulation data;

a decoder coupled to the modulation data register which receives the first quantity of modulation data and decodes graphics data according to the first quantity of modulation data in order to generate display data;

a modulation data address counter which counts quantities of modulation data that are transferred through the data bus interface and which generates a load modulation data signal when a preprogrammed total quantity of modulation data has been transferred through the data bus interface; and an interrupt generation circuit coupled to the modulation data address counter which generates a CPU interrupt in response to the load modulation data signal.

6. A display controller in accordance with claim 5, wherein the modulation data address counter further comprises:

an input which is used for setting the preprogrammed total quantity of modulation data, the preprogrammed total quantity of modulation data indicating an amount of space in an external memory which is allocated to store modulation data.

7. A display controller in accordance with claim 6, further comprising:

a configuration register, coupled to the input of the modulation data address counter, which is used to set the preprogrammed total quantity of modulation data.

8. A method used by a display controller of accessing modulation data from an external memory, comprising the steps of:

generating a data request signal which initiates transfer of a first quantity of modulation data to the display controller from an external memory;

receiving the first quantity of modulation data in a modulation data register;

transferring the first quantity of modulation data to a decoder;

decoding graphics data according to the first quantity of modulation data in order to generate display data;

counting quantities of modulation data that are transferred to the display controller;

generating a load modulation data signal in response to a preprogrammed total quantity of modulation data being transferred to the display controller; and generating a CPU interrupt in response to the load modulation data signal.

9. A method in accordance with claim 8, further comprising the step of:

setting the preprogrammed total quantity of modulation data.

* * * * *